US012700789B2

(12) United States Patent
John

(10) Patent No.: US 12,700,789 B2
(45) Date of Patent: Aug. 4, 2026

(54) APPARATUS FOR GENERATING A DIGITAL SIGNAL DEPENDENT ON A CURRENT SLOPE

(71) Applicant: Renesas Design (UK) Limited, Bourne End (GB)

(72) Inventor: Dantes John, Munich (DE)

(73) Assignee: Renesas Design (UK) Limited, Bourne End (GB)

( * ) Notice: Subject to any disclaimer, the term of this patent is extended or adjusted under 35 U.S.C. 154(b) by 281 days.

(21) Appl. No.: 18/455,367

(22) Filed: Aug. 24, 2023

(65) Prior Publication Data

US 2025/0070669 A1     Feb. 27, 2025

(51) Int. Cl.
*H02M 3/158*     (2006.01)
*H02M 1/00*     (2006.01)
*H02M 3/157*     (2006.01)

(52) U.S. Cl.
CPC ......... *H02M 1/0009* (2021.05); *H02M 3/157* (2013.01); *H02M 3/158* (2013.01)

(58) Field of Classification Search
CPC .... H02M 1/0009; H02M 3/157; H02M 3/158; H02M 3/156; H02M 1/0025
See application file for complete search history.

(56) References Cited

U.S. PATENT DOCUMENTS 9,419,627 B2     8/2016 Guthrie et al.
9,667,260 B2     5/2017 Guthrie et al.

2008/0315793 A1*    12/2008    Sanchez ............. H05B 41/2828
                                                        315/297
2013/0142232 A1      6/2013    Lee
2013/0194848 A1*     8/2013    Bernardinis ........ H02M 3/1584
                                                        363/126
2015/0069990 A1*     3/2015    Feldtkeller ............ H02M 3/158
                                                        323/284
2023/0155472 A1*     5/2023    de Cremoux ........ G01R 19/255
                                                        323/284
2023/0213954 A1      7/2023    Guthrie et al.
2023/0216411 A1      7/2023    Grisamore et al.
2023/0216791 A1      7/2023    Grisamore et al.

FOREIGN PATENT DOCUMENTS

DE          102016120129 A1      4/2017

OTHER PUBLICATIONS

DE Office Action dated May 5, 2024 issued in DE 102023212637.0.
Qiu Y, Liu H, Chen X. "Digital average current-mode control of PWM DC-DC converters without current sensors." IEEE Transactions on Industrial Electronics. Sep. 22, 2009;57(5):1670-7. 8 pages.

(Continued)

*Primary Examiner* — Alex Torres-Rivera

(74) *Attorney, Agent, or Firm* — SCULLY, SCOTT, MURPHY & PRESSER, P.C.

(57)     ABSTRACT

An apparatus for generating a digital signal that is dependent on an average slope of a first current flowing through a circuit element during a sample period, the apparatus comprising a delta-sigma modulator configured to sense the first current during the sample period, and generate the digital signal using the sensed first current.

22 Claims, 19 Drawing Sheets

(56) References Cited

OTHER PUBLICATIONS

Ferdowsi M. "An estimative current mode controller for dc-dc converters operating in continuous conduction mode." InTwenty-First Annual IEEE Applied Power Electronics Conference and Exposition, 2006. APEC'06. Mar. 19, 2006 (pp. 4-pp). IEEE. 5 pages.

Channappanavar R, Mishra SK, Singh RK. "An inductor current estimator for digitally controlled synchronous buck converter." IEEE Transactions on Power Electronics. Aug. 6, 2018;34(5):4883-94. 12 pages.

Kugelstadt T. Auto-zero amplifiers ease the design of high-precision circuits. TI Analog Applications Journal. 2005. 31 pages.

* cited by examiner

800

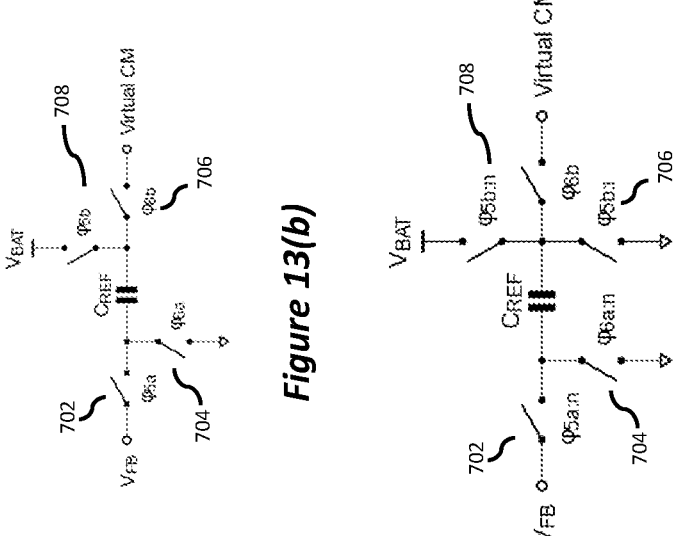
Figure 13(b)
Figure 13(d)
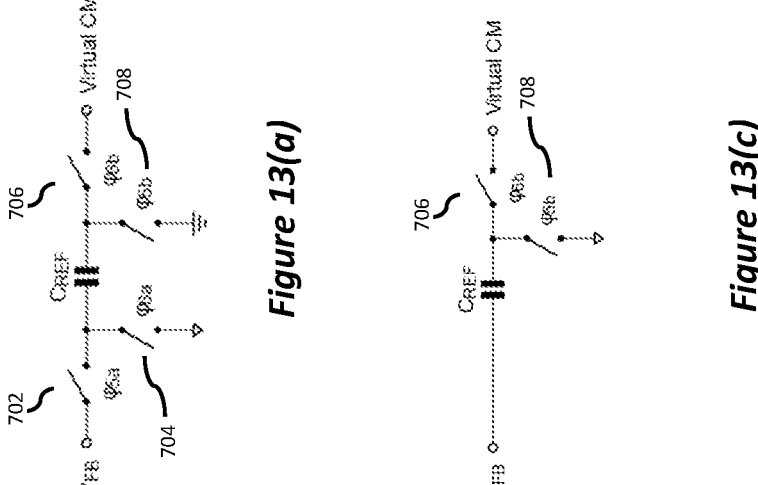
Figure 13(a)
Figure 13(c)

1402
1404
1405
1406
1408
1410
1422
1416
1418
1420
1412
1414

HS
LS
$I_L$
$I_{LS}$
SW
$DS_{CLK}$
$DS_L$
$\varphi4$
$\varphi5$
$\varphi6$
$\varphi1$
$\varphi2$ T start
T end

1400

1700

HS

LS

I_L

I_LS

SW

DS_CLK

DS_L

Φ4

Φ5

Φ6

Φ1

Φ2

T start

T feed

1800

APPARATUS FOR GENERATING A DIGITAL SIGNAL DEPENDENT ON A CURRENT SLOPE

The present disclosure relates to an apparatus for generating a digital signal that is dependent on an average slope of a current flowing through a circuit element.

BACKGROUND

Prior art systems exist for measuring an average inductor current and converting the result to digital (US2023155472A1).

Knowledge of the average inductor current slope in the digital domain is useful for diagnostics and self-calibration of current mode switching converters.

In known systems, the slope can be determined by measuring the current and converting it with an analog to digital converter (ADC) and then measuring the delta change from sample to sample. With the knowledge of the sample rate and channel gains, the current slope can be computed (U.S. Pat. No. 9,419,627B2, U.S. Pat. No. 9,667,260B2).

SUMMARY

It is desirable to provide a system for current slope sensing that operates with improved accuracy and/or lower power requirements than known systems.

It is desirable to provide a system for current slope sensing and analog to digital conversion that can provide a higher accuracy at high switching converter frequencies and a wide range of duty cycles, and with lower power, than known systems.

According to a first aspect of the disclosure there is provided an apparatus for generating a digital signal that is dependent on an average slope of a first current flowing through a circuit element during a sample period, the apparatus comprising a delta-sigma modulator configured to sense the first current during the sample period, and generate the digital signal using the sensed first current.

Optionally, the apparatus comprises a slope calculation unit configured to receive the digital signal, and determine the average slope of the first current during the sample period using the digital signal.

Optionally, the delta-sigma modulator is configured to sense the first current flowing through the circuit element of a switching converter.

Optionally, the circuit element is an inductor and the switching converter is one of a buck converter, a boost converter and a buck-boost converter.

Optionally, the delta-sigma modulator is configured to sense the first current flowing through the circuit element by sensing a current flow through a first power switch of the switching converter.

Optionally, the apparatus comprises a diagnostic unit configured to undertake a diagnosis of the switching converter operation using the average slope of the first current, as determined.

Optionally, the apparatus comprises a self-calibration unit configured to calibrate the switching converter based on the average slope of the first current, as determined.

Optionally, the delta-sigma modulator is configured to sense the first current at a first time step and at a second time step within the sample period, and generate the digital signal using the first current as sensed at the first time step and at the second time step.

Optionally, the delta-sigma modulator comprises a summing circuit configured to sense the first current at the first time step by measuring a first voltage across a sense element at the first time step, sense the first current at the second time step by measuring the first voltage across the sense element at the second time step, generate a difference signal that is dependent on the first voltage at the second time step subtracted from the first voltage at the first time step, wherein the first voltage is dependent on the first current.

Optionally, the first current is equal to the first voltage divided by a first resistance of the sense element.

Optionally, the sense element comprises a first switch having a first resistance, the summing circuit comprises a mirror switch having a second resistance, and forming a switch pair comprising the first switch and the mirror switch.

Optionally, the first switch comprises a first transistor, and the mirror switch comprises a second transistor, wherein the gates of each of the first and second transistors are configured to receive a supply voltage.

Optionally, the second resistance is a multiple of the first resistance.

Optionally, the gate voltages of the first and second transistors are approximately equal, and the drain-source voltages of the first and second transistors are approximately equal.

Optionally, the summing circuit comprises a first capacitor having a first terminal coupled to a first terminal of the first transistor via a first switch, and a ground terminal via a second switch, and a second terminal coupled to a difference node via a third switch, and a common mode gain terminal via a fourth switch, and a second capacitor having a first terminal coupled to a first terminal of the mirror transistor via a fifth switch, and the common mode gain terminal via a sixth switch, and a second terminal coupled to the difference node via a seventh switch, and the ground terminal via an eighth switch.

Optionally, the delta-sigma modulator comprises a first integration circuit configured to receive the difference signal and to generate an integrated voltage signal.

Optionally, the first integration circuit comprises a first differential amplifier.

Optionally, the first differential amplifier comprises a first input terminal configured to receive the difference signal, and an output terminal configured to output the integrated voltage signal and coupled to the first input terminal.

Optionally, the first integration circuit comprises a first integration circuit capacitor, and the first input terminal of the first differential amplifier is coupled to the output terminal of the first differential amplifier via the first integration circuit capacitor.

Optionally, the delta-sigma modulator comprises a first comparator configured to receive the integrated voltage signal and to output the digital signal.

Optionally, the first comparator receives a clock signal, a sample rate of the delta-sigma modulator being dependent on the clock signal.

Optionally, the sense element comprises a first switch having a first resistance, the summing circuit comprises a mirror switch having a second resistance, and forming a switch pair comprising the first switch and the mirror switch.

Optionally, the first switch comprises a first transistor, and the mirror switch comprises a second transistor, wherein the gates of each of the first and second transistors are configured to receive a supply voltage.

Optionally, the second resistance is a multiple of the first resistance.

Optionally, the gate voltages of the first and second transistors are approximately equal, and the drain-source voltages of the first and second transistors are approximately equal.

Optionally, the delta-sigma modulator comprises a current source coupled to the second transistor, and a feedback circuit configured to receive the digital signal and to control the current source based on the received digital signal.

Optionally, the feedback circuit comprises an AND gate.

Optionally, a pulse density of the digital signal is dependent on the average slope of the first current during the sample period.

Optionally, the pulse density is proportional to the average slope of the first current during the sample period.

Optionally, the slope calculation unit is configured to determine the average slope of the first current during the sample period by calculating the average of the digital signal, determining the average difference in the first current during the sample period using the average of the digital signal.

Optionally, the slope calculation unit is configured to determine the average slope of the first current during the sample period by dividing the average difference in the first current during the sample period by a duration of the sample period.

Optionally, the digital signal comprises a plurality of bits.

Optionally, the delta-sigma modulator comprises a multi-bit quantizer configured to generate the digital signal.

Optionally, the multi-bit quantizer comprises an inverter, wherein the digital signal is inverted using the inverter prior to being provided as an output.

Optionally, the multi-bit quantizer comprises an analog to digital converter.

Optionally, the analog to digital converter is a flash ADC.

Optionally, the delta-sigma modulator is configured to sense the first current at a first time step and at a second time step within the sample period, and generate the digital signal using the first current as sensed at the first time step and at the second time step.

Optionally, the delta-sigma modulator comprises a summing circuit configured to sense the first current at the first time step by measuring a first voltage across a sense element at the first time step, sense the first current at the second time step by measuring the first voltage across the sense element at the second time step, generate a difference signal that is dependent on the second voltage subtracted from the first voltage, wherein the first voltage is dependent on the first current.

Optionally, the delta-sigma modulator comprises a first integration circuit configured to receive the difference signal and to generate an integrated voltage signal.

Optionally, the first integration circuit comprises a first differential amplifier.

Optionally, the first differential amplifier comprises a first input terminal configured to receive the difference signal, and an output terminal configured to output the integrated voltage signal and coupled to the first input terminal.

Optionally, the first integration circuit comprises a first integration circuit capacitor, and the first input terminal of the first differential amplifier is coupled to the output terminal of the first differential amplifier via the first integration circuit capacitor.

Optionally, the delta-sigma modulator comprises a most significant bit digital to analog converter for generating a first analog output signal for use in the generation of the most significant bits of the digital signal, and a least significant bit digital to analog converter for generating a second analog output signal for use in the generation of the least significant bits of the digital signal.

Optionally, the sense element comprises a first switch having a first resistance, the most significant bit digital to analog converter comprises a first mirror switch having a second resistance, the least significant bit digital to analog converter comprises a second mirror switch having a third resistance, and a switch trio formed, comprising the first switch, the first mirror switch and the second mirror switch Optionally, the first switch comprises a first transistor, and the first mirror switch comprises a first mirror transistor, the second mirror switch comprises a second mirror transistor, wherein the gates of each of the first transistor, the first mirror transistor and the second mirror transistor are configured to receive a supply voltage.

Optionally, the second resistance and the third resistance are multiples of the first resistance.

Optionally, the gate voltages of the first, second and third transistors are approximately equal, and the drain-source voltages of the first, the second and the third transistors are approximately equal.

Optionally, the delta-sigma modulator comprises a first current source coupled to the first mirror transistor, a second current source coupled to the second mirror transistor, and a feedback circuit configured to receive the digital signal and to control the first current source and the second current source based on the received digital signal.

Optionally, the feedback circuit comprises a feedback digital to analog converter control circuit.

According to a second aspect of the disclosure there is provided a method of generating a digital signal that is dependent on an average slope of a first current flowing through a circuit element during a sample period, the method comprising sensing, using a delta-sigma modulator, the first current during the sample period, and generating, using the delta-sigma modulator, the digital signal using the sensed first current.

It will be appreciated that the method of the second aspect may include features set out in the first aspect and can incorporate other features as described herein.

BRIEF DESCRIPTION OF THE DRAWINGS

This disclosure is described in further detail below by way of example and with reference to the accompanying drawings, in which:

FIG. 13(a) is a schematic of the reference capacitor section for low side switch sensing, as shown in the apparatus of FIG. 7, FIG. 13(b) is a schematic of the reference capacitor section for high side switch sensing, as shown in the apparatus of FIG. 9, FIG. 13(c) is a schematic of an alternative embodiment of the reference capacitor section as may replace the reference capacitor sections of FIG. 7 and FIG. 9, FIG. 13(d) is a schematic of an embodiment of the reference capacitor section as may be applied for use with a buck-boost converter.

DETAILED DESCRIPTION

Figure 1:
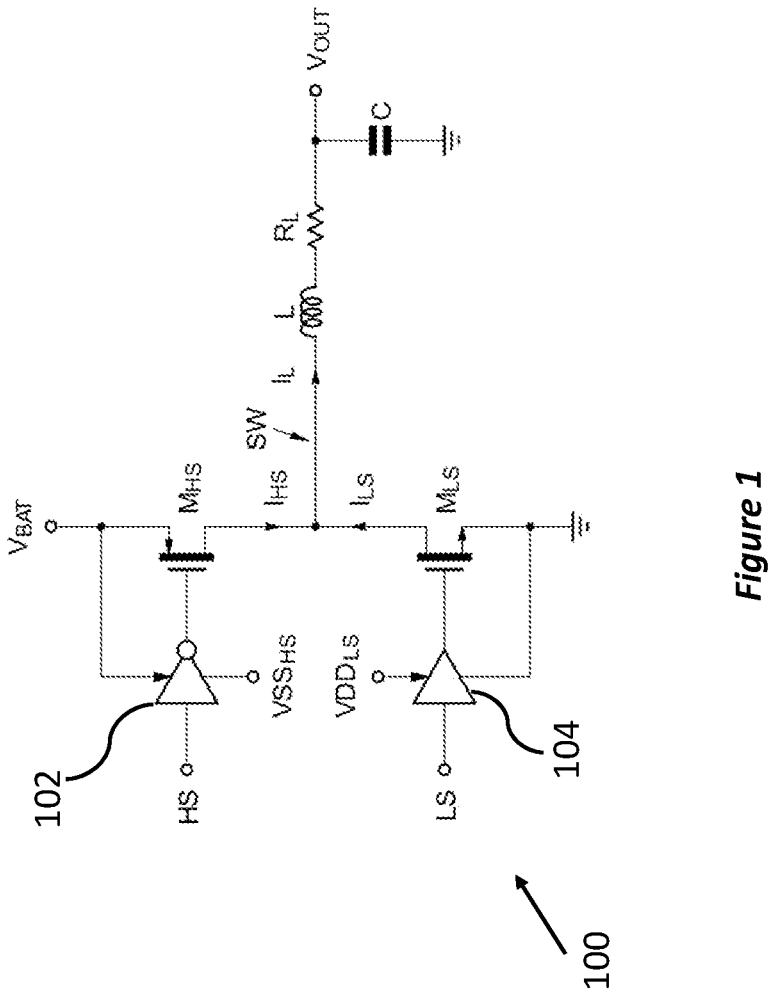
FIG. 1 is a schematic of a buck converter.

FIG. 1 is a schematic of a buck converter 100 comprising inverting level shifter 102; non-inverting level shifter 104; power switches $M_{HS}$, $M_{LS}$; and inductor L; a resistance $R_L$; and a capacitor C. The buck converter 100 receives an input voltage $V_{BAT}$ and generates an output voltage $V_{OUT}$.

During operation, a control signal HS turns on $M_{HS}$ if HS=1 (due to the inverting level shifter 102). Likewise control signal LS turns on $M_{LS}$ if LS=1.

Intermediate supplies (VSS$_{HS}$ and VDD$_{LS}$) may be needed if the maximum gate source voltage VGS(MAX)

requirements of each corresponding switching device ($M_{HS}$, $M_{LS}$), are lower than the input voltage $V_{BAT}$.

During operation, the level shifters 102, 104 will drive a node SW to either $V_{BAT}$ or ground. Due to the filter formed by L and C, the output voltage $V_{OUT}$ will be a filtered version of the voltage at SW with low ripple.

$R_L$ is a resistance that includes the inductor resistance and the routing resistance. For the buck converter 100 to function correctly, both switch $M_{HS}$ and switch $M_{LS}$ must not be simultaneously active during operation.

The direction of the low side switch current $I_{LS}$ is chosen to be the same as that of an inductor current $I_L$, to simplify the explanation of the buck converter's 100 behaviour.

Due to a voltage being applied across the inductor L, the inductor current $I_L$ is created in the inductor L. For current mode control, it is necessary to measure this current.

Since the inductor current IL flows through either the switch $M_{HS}$ or the switch $M_{LS}$ when either is active, it is sufficient to measure the current through these pass devices $M_{HS}$, $M_{LS}$ to estimate the current IL in the inductor L.

Also, since the inductor current $I_L$ is continuous, it is not always necessary to measure both $M_{HS}$ and $M_{LS}$ in many cases since they provide redundant information. Specific embodiments of the present disclosure, as described in more detail below, focus on current sense by measuring the current through these switching pass devices.

Embodiments of the present disclosure may be applied to current mode switching power converters such as the buck converter 100, or a boost converter or a buck-boost converter. However, it will be appreciated that embodiments of the present disclosure may be applied to other systems, in accordance with the understanding of the skilled person.

Figures 2A, 2B, 2C, 2D:
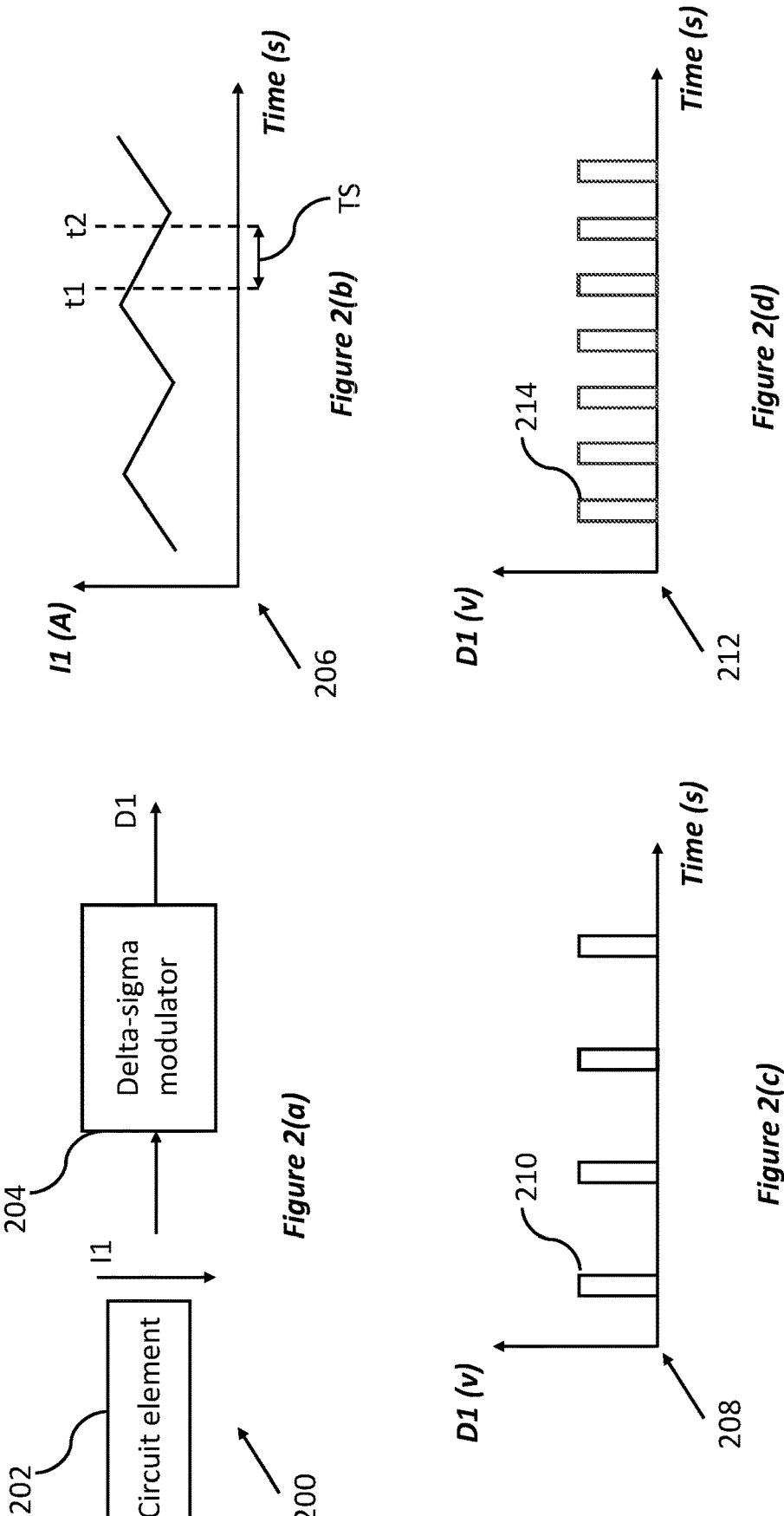
FIG. 2(a) is a schematic of an apparatus for generating a digital signal in accordance with a first embodiment of the present disclosure.
FIG. 2(b) is a time graph showing a current flowing through a circuit element of FIG. 2(a) varying with time.
FIG. 2(c) is a timing graph showing the digital signal for a first average slope of the current.
FIG. 2(d) is a timing graph showing the digital signal for a second average slope of the current.

FIG. 2(a) is a schematic of an apparatus 200 for generating a digital signal D1 that is dependent on an average slope of a current I1 flowing through a circuit element 202 during a sample period, in accordance with a first embodiment of the present disclosure. The apparatus 200 comprises a delta-sigma modulator 204 configured to sense the current I1 during the sample period and generate the digital signal D1 using the sensed current I1. A delta-sigma modulator is a system that uses oversampling to convert analog signals into digital signals. The average slope refers to the average rate of change of the current I1 with time. This may also be referred to as the average gradient of the slope. The digital signal D1 may be a data stream that results from the sensing and conversion of an average current slope into a digital signal.

FIG. 2(b) is a time graph 206 showing a current flowing through the circuit element 202 varying with time. In the present example, to aid in the explanation, we will consider application of the present system to the buck converter 100, such that the circuit element is the inductor L. However, it will be appreciated that the circuit element 202 may be part of a system other than a buck converter, and it may be a component other than an inductor, in accordance with the understanding of the skilled person. It should be noted that the waveform shape shown in FIG. 2(b) will apply for a 2-state converter, like buck converters and boost converters, but more complex shapes may be present in other topologies.

In the present example, the time graph 206 shows the inductor current $I_L$ flowing through the inductor L. For example, the inductor L of the buck converter 100. The sample period, as mentioned previously is denoted by "TS" in FIG. 2(b).

Returning the apparatus 200, the delta-sigma modulator 204 may sense the current I1 at a first time step t1 and at a second time step t2. The digital signal D1 may then be generated using the sensed current I1 at time steps t1, t2.

In a specific embodiment, a pulse density of the digital signal D1 may be dependent on the average slope of the current I1 during the sample period TS.

FIG. 2(c) is a timing graph 208 showing the digital signal D1 (a trace 210) for a first average slope of the current I1. FIG. 2(d) is a timing graph 212 showing the digital signal D1 (a trace 214) for a second average slope of the current I1. In the present example, illustrated by FIG. 2(c) and FIG. 2(d), the pulse density of the digital signal D1 is proportional to the average slope of the current I1 such that FIG. 2(c) may represent an example where the average slope is less than the average slope of the example provided by FIG. 2(d).

In a further embodiment, there may be a different relationship between the pulse density and the average slope. For example, the pulse density may be inversely proportional to the average slope of the current I1 during the sample period TS.

Figures 3A, 3B, 3C:
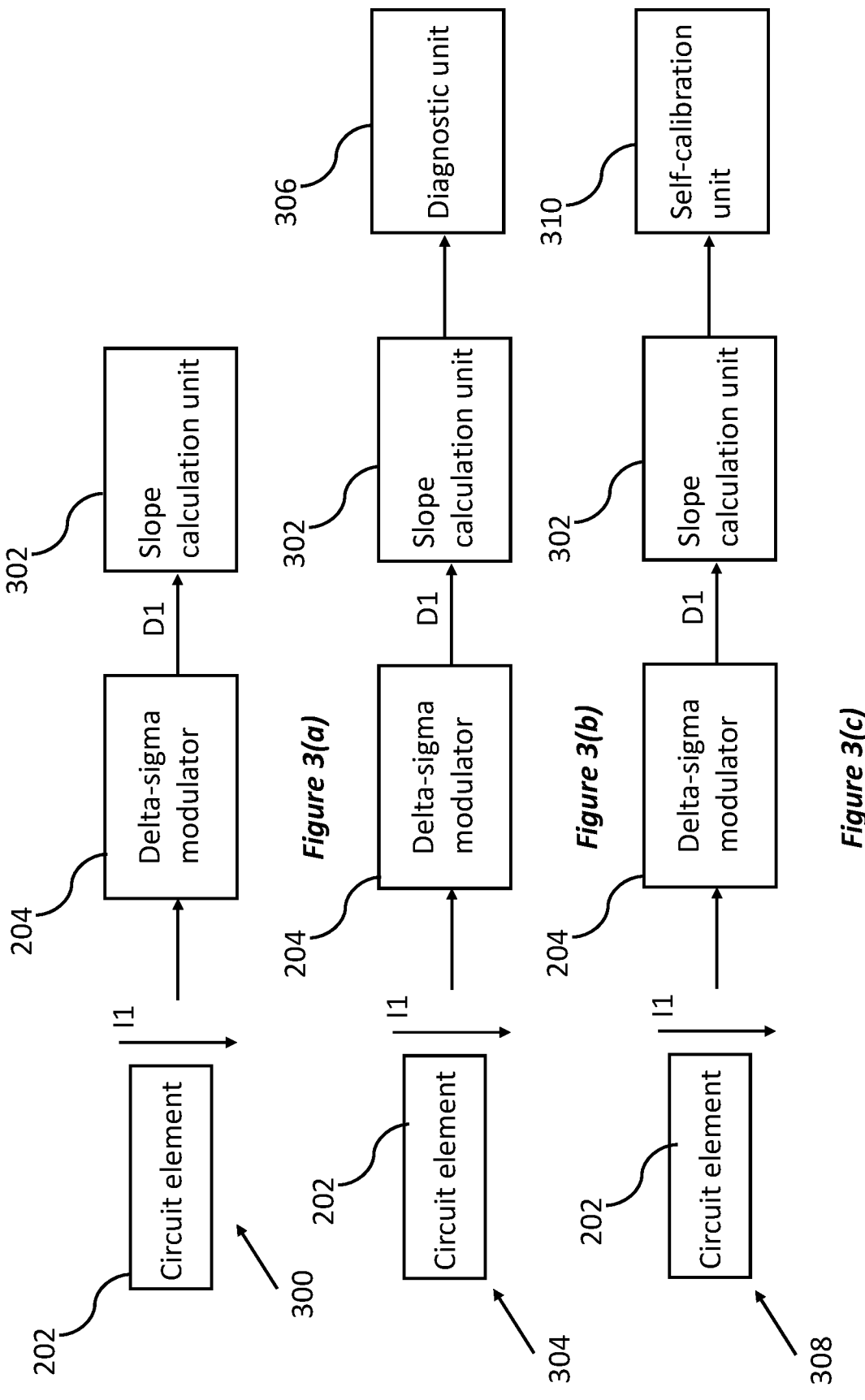
FIG. 3(a) is a schematic of an apparatus for generating the digital signal in accordance with a second embodiment of the present disclosure.
FIG. 3(b) is an apparatus, in accordance with a third embodiment of the present disclosure.
FIG. 3(c) is an apparatus, in accordance with a fourth embodiment of the present disclosure.

FIG. 3(a) is a schematic of an apparatus 300 for generating the digital signal D1 that is dependent on the average slope of a current I1 flowing through the circuit element 202 during a sample period, in accordance with a second embodiment of the present disclosure. In the present embodiment, the apparatus 300 further comprises a slope calculation unit 302. During operation, the slope calculation unit 302 receives the digital signal D1 and then determines the average slope of the current I1 during the sample period TS using the digital signal D1.

As the digital signal D1 is dependent on the average slope of the current I1, it is possible to extract this information from the digital signal D1, with this functionality being enabled by the slope calculation unit 302.

For example, the slope calculation unit 302 may determine the average of the digital signal D1. With reference to FIGS. 2(c) and 2(d), the average of D1 over several pulses will be dependent on the pulse density, which is in turn dependent on the average slope of the current I1.

In a specific embodiment, the average difference in the current I1 during the sample period may be determined using the average of the digital signal D1. The average difference in the current I1 may then be divided by a duration of the sample period to determine the average slope.

By way of example, and with reference to FIG. 2(b) we may consider the current I1 at the time t1 being represented by I1(t1) and the current I1 at time t2 being represented by I1(t2) with the average difference in the current being represented by:

$$\overline{\Delta I1} = \overline{I1(t2) - I1(t1)} \tag{1}$$

In the present embodiment, the average of the digital signal D1 can be used to determine $\overline{\Delta I1}$ as provided by equation (1). The average slope may then be calculated as follows:

$$\overline{Slope} = \frac{\overline{\Delta I1}}{\Delta t} = \frac{\overline{I1(t2) - I1(t1)}}{t2 - t1} \tag{2}$$

FIG. 3(b) is an apparatus 304, in accordance with a third embodiment of the present disclosure. In the present embodiment, the apparatus 304 further comprises a diagnostic unit 306 configured to undertake a diagnosis of a switching converter operation using the average slope of the current I1, as determined.

FIG. 3(c) is an apparatus 308, in accordance with a fourth embodiment of the present disclosure. In the present embodiment, the apparatus 308 further comprises a self-calibration unit 310 configured to calibrate a switching converter based on the average slope of the current I1, as determined.

The delta-sigma modulator may be configured to sense the current I1 flowing through the circuit element 202 of a switching converter such as a buck converter, a boost converter or a buck-boost converter. The circuit element 202 may be an inductor. The current flowing through the circuit element 202 may be sensed by sensing a current flow through a power switch of a switching converter.

Figure 4B:
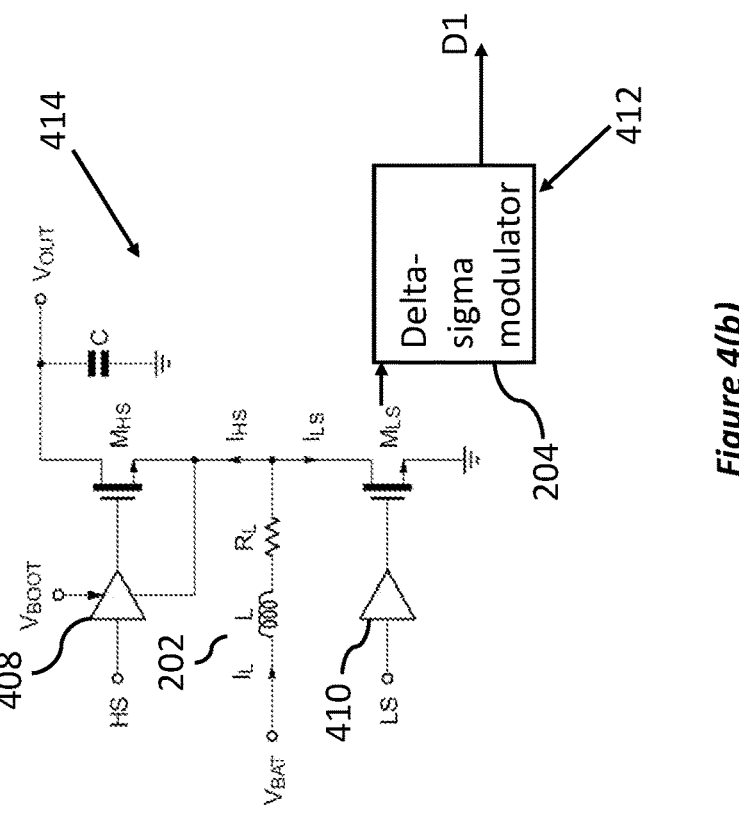
FIG. 4(b) is a schematic of an apparatus in accordance with a sixth embodiment of the present disclosure.
Figure 4A:
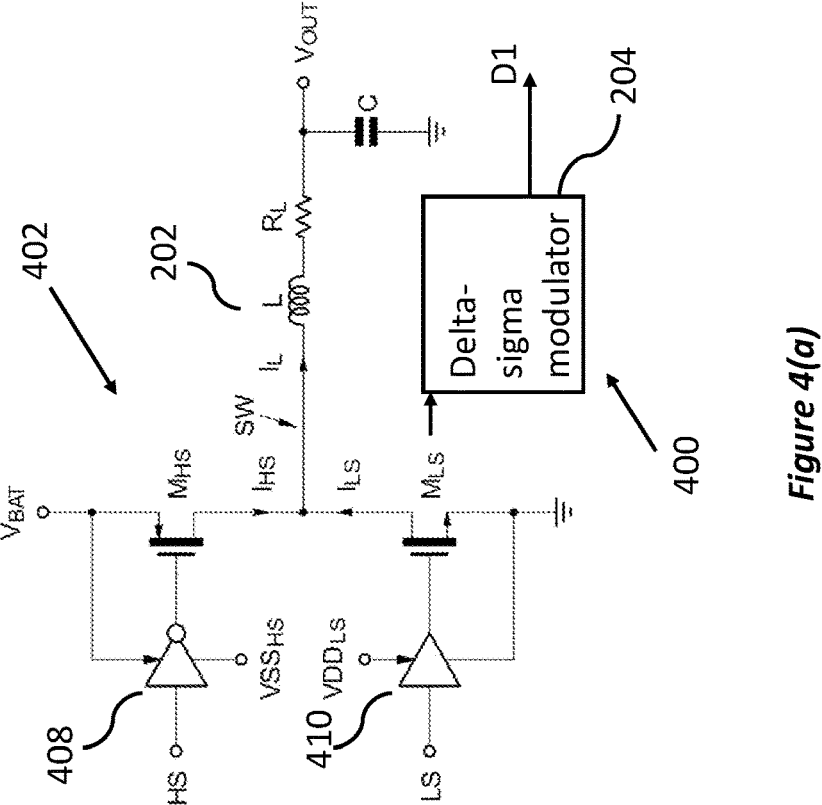
FIG. 4(a) is a schematic of an apparatus in accordance with a fifth embodiment of the present disclosure.

FIG. 4(a) is a schematic of an apparatus 400 in accordance with a fifth embodiment of the present disclosure. In the present embodiment, the circuit element 202 is an inductor L that is part of a buck converter 402. In the present example, the current flowing through the inductor L is sensed by sensing the current flowing through a low side power switch $M_{LS}$. In further embodiments, the current may be sensed through a high side power switch $M_{HS}$.

The buck converter 402 comprises the power switches $M_{LS}$, $M_{HS}$ gate drivers 408, 410, the inductor L, a resistance $R_L$ and a capacitor C.

In the present embodiment, the delta-sigma modulator 204 measures the inductor current IL slope by measuring a current ILS through the low side switch $M_{LS}$.

It will be appreciated that LS means "low side" which is typically the NMOS switch tied from a switching node to ground. HS likewise means "high side", which is typically either a PMOS; or a NMOS with a bootstrap capacitor to drive the gate of the NMOS. In certain cases, for example with negative voltages, the type of transistor may be inverted. Therefore, it will be appreciated that LS and HS are used instead of NMOS/PMOS as a means of referring to the location, rather than the type, of transistor.

FIG. 4(b) is a schematic of an apparatus 412 in accordance with a sixth embodiment of the present disclosure. In the present embodiment, the circuit element 202 is the inductor L that is part of a boost converter 414. This is an example of a boost converter with a NMOS high-side. $M_{HS}$ is driven from a gate driver whose positive supply is derived from a bootstrap circuit to generate sufficient VGS for $M_{HS}$ to turn on. Note that the direction of the currents is drawn in reverse.

Figure 4C:
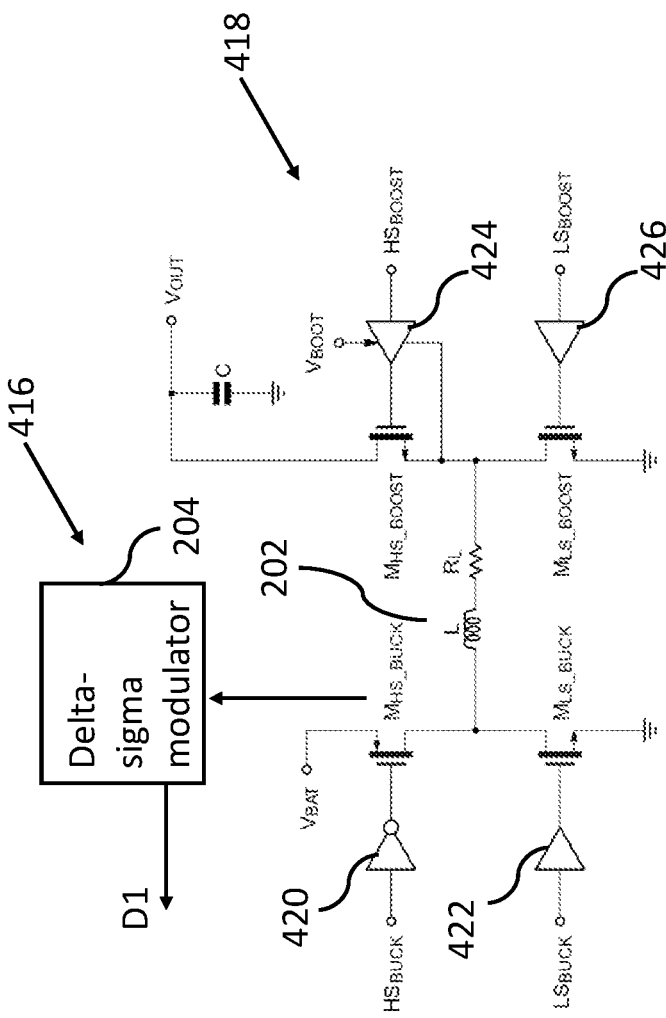
FIG. 4(c) is a schematic of an apparatus in accordance with a seventh embodiment of the present disclosure.

FIG. 4(c) is a schematic of an apparatus 416 in accordance with a seventh embodiment of the present disclosure. In the present embodiment, the circuit element is the inductor L that is part of a buck boost converter 418. The buck-boost converter comprises gate drivers 420, 422, 424, 426 and switches $M_{HS\_BUCK}$, $M_{LS\_BUCK}$, $M_{HS\_BOOST}$, $M_{LS\_BOOST}$.

This is an example of a positive buck boost. There are 4 possible paths the currents can take in the positive current case:

1. VBAT→MHS_BUCK→L, RL→MLS_BOOST→GND:(BOOST Magnetization) Use MLS_BOOST sense

2. VBAT→MHS_BUCK→L, RL→MHS_BOOST→VOUT:(BUCK Magnetization) Use MHS_BUCK sense

3. GND→MLS_BUCK→L, RL→MHS_BOOST→VOUT:(De-magnetization) Use MLS_BUCK sense

4. GND→MLS_BUCK→L, RL→MLS_BOOST→GND:(Null) Do not use any sense

Three current sense schemes around the three switches can be used for the three cases above (1. to 3.).

It should be noted that for VBAT→MHS_BUCK→L, RL→MHS_BOOST→VOUT (case 2.), the current slope can be either rising or falling, hence special changes should be done for the reference feedback for the HSBUCK.

Figures 5A, 5B, 5C:
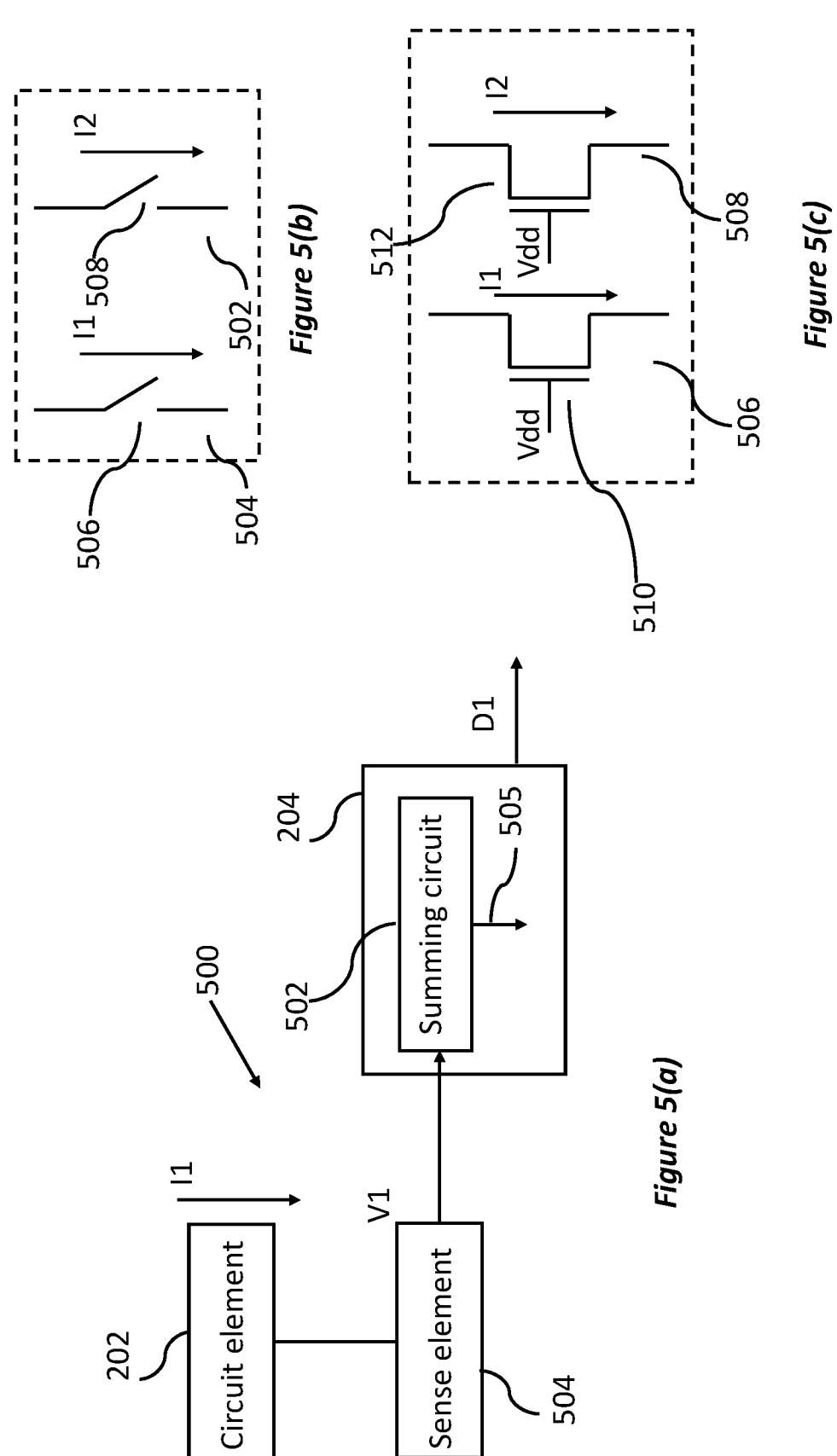
FIG. 5(a) is a schematic of an apparatus in accordance with an eighth embodiment of the present disclosure.
FIG. 5(b) is a schematic of an example embodiment of the sense element and the summing circuit.
FIG. 5(c) is a schematic of an example embodiment of the switches.

FIG. 5(*a*) is a schematic of an apparatus 500 in accordance with an eighth embodiment of the present disclosure. In the present embodiment, the delta-sigma modulator 204 comprises a summing circuit 502 that is configured to sense the current I1 at the time step t1 by measuring a voltage V1 across a sense element 504 at the time step t1; and sense the current I1 at the time step t2 by measuring the voltage V1 across the sense element 504 at the time step t2.

The summing circuit 502 is configured to then generate a difference signal 505 that is dependent on the voltage V1 the second time step t2 subtracted from the voltage V1 at the first time step t1. The current I1 may be equal to the voltage V1 divided by a resistance of the sense element 504.

The sense element 504 enables the average current slope in the circuit element 202 to be measured by proxy. For example, in a buck converter where the circuit element 202 is an inductor, the sense element 504 may be a power switch (such as the switch $M_{ls}$ of FIG. 4(*a*)).

FIG. 5(*b*) is a schematic of an example embodiment of the sense element 504 and the summing circuit 502. In the present embodiment, the sense element 504 comprises a switch 506 having a resistance; and the summing circuit 502 comprises a mirror switch 508 having a resistance. A switch pair is formed by the switches 506, 508 with the current I1 flowing through the switch 506 and a current I2 flowing through the switch 508.

FIG. 5(*c*) is a schematic of an example embodiment of the switches 506, 508 being implemented using transistors 510, 512, each having their gates coupled to a supply voltage Vdd.

The resistance of the transistor 512 may be a multiple of the resistance of the transistor 510. The gate voltages of the transistors 510, 512 are approximately equal, and the drain-source voltages of the transistors 510, 512 may be approximately equal.

It will be appreciated that in the present disclosure, several embodiments are described using the mirror transistor-based approach as illustrated in FIG. 5(*c*) which uses the pass device 510 for sensing. It will be appreciated that in a further embodiment, rather than a mirror based approach, a sense resistor may be used to extract the relevant voltage information for sensing the current flow.

Figure 6B:
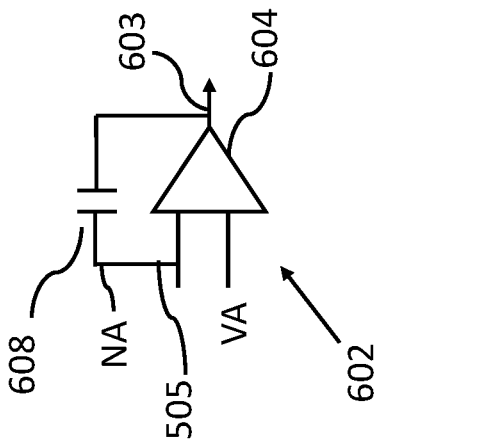
FIG. 6(b) is a schematic of a specific embodiment of the integration circuit comprising a differential amplifier.
Figure 6A:
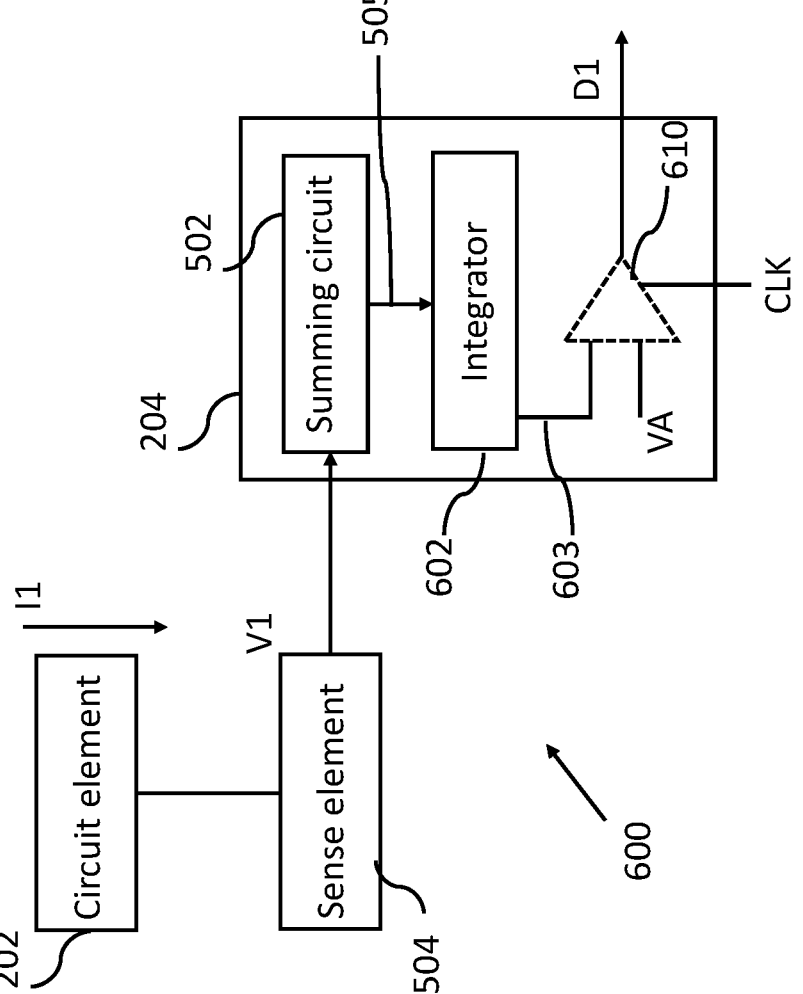
FIG. 6(a) is a schematic of an apparatus in accordance with ninth embodiment of the present disclosure.

FIG. 6(*a*) is a schematic of an apparatus 600 in accordance with ninth embodiment of the present disclosure. In the present embodiment, the delta-sigma modulator 204 comprises an integration circuit 602 that is configured to receive the difference signal 505 and to generate an integrated voltage signal 603.

FIG. 6(*b*) is a schematic of a specific embodiment of the integration circuit 602 comprising a differential amplifier 604. The differential amplifier 604 comprises an input terminal configured to receive the difference signal 505 and has an output terminal for outputting the integrated voltage signal 603. The output terminal is coupled to the input terminal via a capacitor 608. An input of the differential amplifier 604 may be coupled to a voltage VA.

The delta sigma modulator 204 may further comprise a comparator 610 that is configured to receive the integrated voltage signal 603 and to output the digital signal D1. The comparator 610 may receive a clock signal CLK with the sample rate of the delta sigma modulator 204 being dependent on the clock signal CLK. An input of the comparator 610 may be coupled to the voltage VA.

In a specific embodiment, during operation the integrator 602 may integrate the charge injected into a node NA from a correlated double sample CDS circuit.

Figure 7:
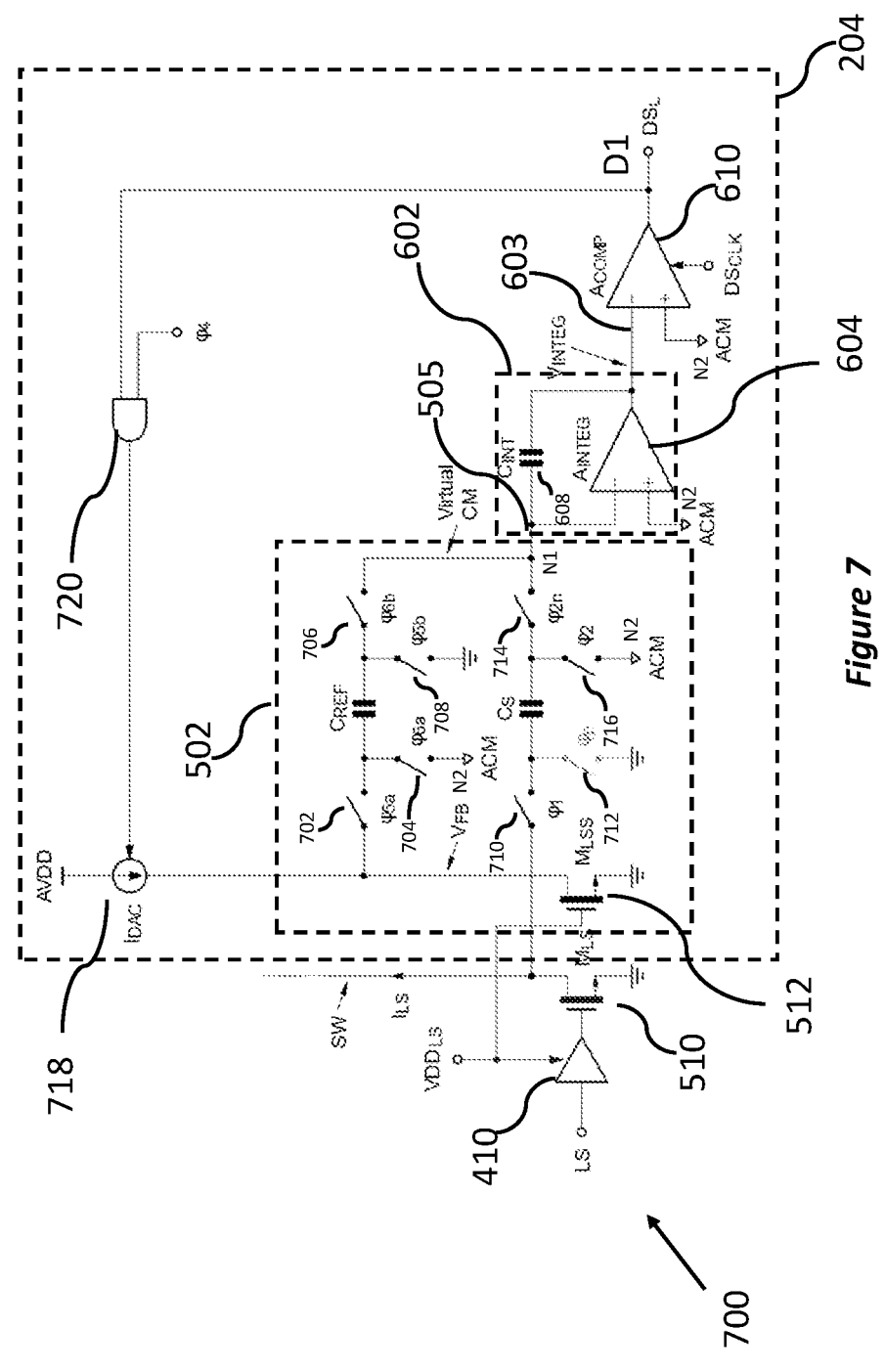
FIG. 7 is a schematic of an apparatus in accordance with a tenth embodiment of the present disclosure.

FIG. 7 is a schematic of an apparatus 700 in accordance with a tenth embodiment of the present disclosure. In the present example, there is shown a specific embodiment of the delta-sigma modulator 204 used with the buck converter 402 of FIG. 4(*a*). It will be appreciated that only the low side switch $M_{LS}$ and driver 410 of the buck converter 402 are shown to aid in the clarity of the drawing and description. It will be appreciated that in a further embodiment, the delta-sigma modulator 204 may be used with the high side switch $M_{HS}$.

In the present example, the summing circuit 502 comprises capacitors $C_{REF}$ and $C_S$; and switches 702, 704, 706, 708, 710, 712, 714, 716. The summing circuit 502 also comprises a difference node N1 and a common mode terminal N2 at a common mode voltage ACM. It will be appreciated that the difference node N1 may be referred to as a virtual common mode or a summing node. It will be appreciated that normally the node N1 will see a vanishingly small voltage change due to the infinite gain/bandwidth of an ideal differential amplifier 604. Rather this summing node N1 really ends up summing charge pumped into it from various other nodes through the capacitors.

The common mode terminal voltage ACM is just a generalization of the voltage that can be applied to the + input of $A_{INTEG}$, which should be the same as that of other nodes marked ACM. In practice, this is chosen to be well within the input common mode range of $A_{INTEG}$.

The delta-sigma modulator 204 may further comprise a current source 718 coupled to the transistor 512, and a feedback circuit 720 that is configured to receive the digital signal D1 and to control the current source 718 based on the received digital signal D1. The feedback circuit 720 may comprise an AND gate.

The mirror device (transistor 512) is used in the feedback path of the delta-sigma modulator 204. In operation, the delta-sigma-modulator integrates the voltage difference on the node SW and will try to cancel that with the feedback from the voltage across the transistor 512.

The delta sigma converter 204 is a "discrete time switched capacitor" circuit that samples and integrates charge onto the integrating capacitor 608, and this causes a corresponding voltage at the output of the differential amplifier 604. Unlike a conventional delta sigma converter 204, the summing circuit 502 (which may be referred to as a correlated double sampler), samples the input signal twice and with the connection shown, manages to dump a charge corresponding to the difference in voltage at those two different times into the integrating capacitor 608.

Figure 8:
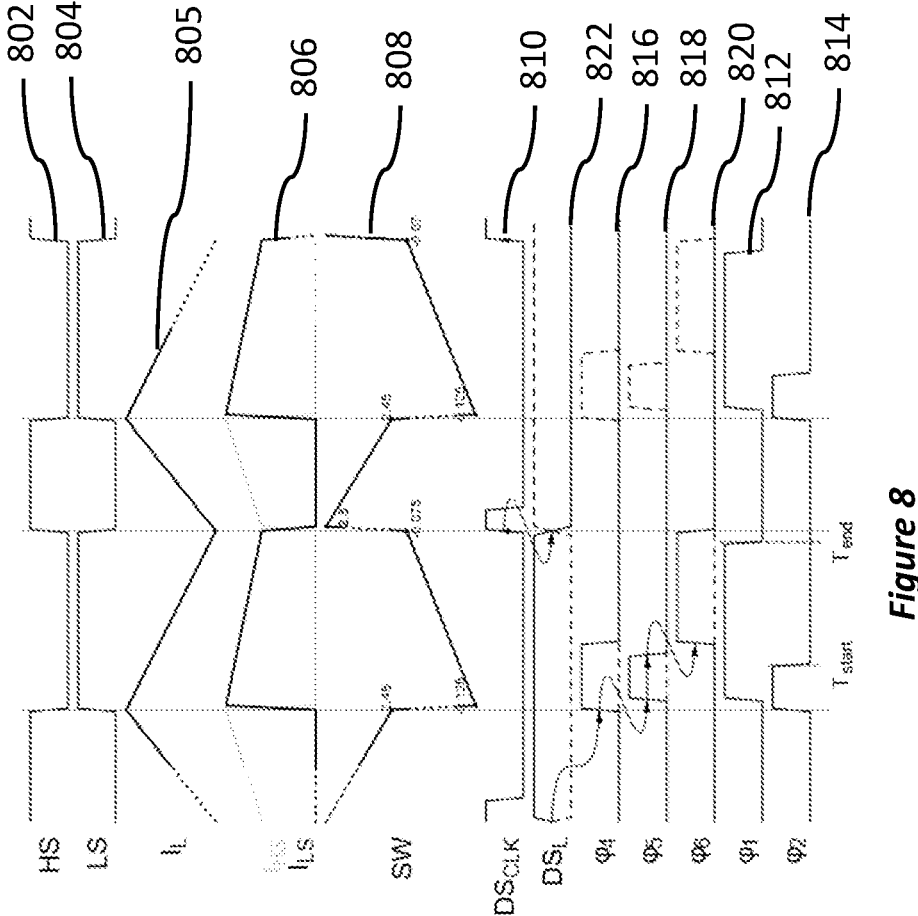
FIG. 8 is a timing graph showing an example operation of the delta-sigma modulator of FIG. 7 used with the buck converter of FIG. 4(a)

FIG. 8 is a timing graph 800 showing an example operation of the delta-sigma modulator 204 of FIG. 7 used with the buck converter 402 of FIG. 4(*a*). There is shown a high side switch control signal (a trace 802); a low side switch control signal (a trace 804); a current flow through the inductor (a trace 805); a current flow through the low side switch $M_{LS}$ (a trace 806); a voltage at a switch node SW (a trace 808); a clock signal $DS_{CLK}$ (also labelled as CLK in other embodiments, and shown by a trace 810); and control signals as provided to the switches shown in FIG. 7 and labelled as follows φ1 (a trace 812), φ2 (a trace 814), φ4 (a trace 816), φ5 (a trace 818), φ6 (a trace 820); and the digital signal D1 (also labelled as $DS_L$, and shown by a trace 822). Note that the numbers provided for the SW waveform (trace 808) are for illustration purposes only, and in practice may differ whilst having a similar shape.

The mirror device 512 (also labelled) $M_{LSS}$ will have its ground tied to the same ground as the pass device 510 and its gate will be connected to the same supply $VDD_{LS}$ (labelled as Vdd in other embodiments) as the driver of the switch $M_{LS}$, such that the gate voltage of both will be the same when the pass device 510 is ON.

The switch $M_{LSS}$ may be a scaled down version of the switch $M_{LS}$ (by a known fixed ratio, $K_N$). Due to the common connections, the drain-to-source resistance of the switch $M_{LSS}$ may be $K_N$ times the drain-to-source resistance of the switch $M_{LS}$ when the switch $M_{LS}$ is turned on.

In the present example, the current slope in the inductor is measured by proxy, and by measuring the current slope in the switch $M_{LS}$. Generally speaking, this involved measuring a voltage which is related to current through Ohm's law where the voltage is equal to current multiplied by a resistance (in the present example, the on resistance of a switch) at two different times through a correlated double sample CDS circuit combined with a discrete time delta sigma circuit. In the present example, the CDS circuit comprises the switches 710, 712, 714, 716 and the capacitor $C_S$.

To understand the operation of the system illustrated in FIG. 7, we trace the signal starting from LS, which is the low side switch control signal. As LS goes high, the switch $M_{LS}$ turns on and thus the current $I_{LS}$ will cause a voltage $V_{LS}=R_{DS(ON),MLS}\times-I_{LS}$ to develop on the SW node (note the direction of $I_{LS}$). $R_{DS(ON),MLS}$ is the on resistance of the switch $M_{LS}$.

It will be appreciated that the timings shown in FIG. 8 represent a single example, and further embodiments may exhibit different timing characteristics. For example, it is possible to have a shorter duration for any of the control signals φ1-φ6 without changing the essential function of the circuit. With reference to FIG. 7, the control signal $φ_{2N}$ is the inverse of the control signal $φ_2$.

Taking the timings of φ1 and φ2, we see that during the time both are high, the switches 710, 716 corresponding to those signals are turned on, and thus, the voltage across the capacitor $C_S$ tracks the voltage $V_{LS}$. An optional pre-charge switch 712 receiving control signal φp can be used prior to this operation (and typically during the HS active time) to bring the voltage across $C_S$ to the (GND-VCM) to reduce settling time, as well as to reduce coupling issues from high SW swings that may couple through the parasitic capacitance of φ1 during the HS period. VCM refers to the voltage on the virtual common node, also labelled node N1.

After φ2 turns off (labelled Tstart on FIG. 8), which also turns on φ2n, any change in $V_{LS}$ will result in a change in the voltage across the capacitor $C_{INT}$ (and thus $V_{INTEG}$) due to the action of the integrator 602. "$V_{INTEG}$" is an integrated voltage signal.

The change in $V_{INTEG}$ for one such switching cycle (between $T_{start}$ and $T_{end}$) is as follows:

$$\Delta V_{INTEG} = -\left(\frac{C_S}{C_{INT}}\right)\Delta V_{LS} = \left(\frac{C_S}{C_{INT}}\right)\Delta I_{LS}R_{DS(ON),MLS} \quad (3)$$

$\Delta V_{LS}$ is the change in the voltage $V_{LS}$ and current $\Delta I_{LS}$ is the change in the current $I_{LS}$. Note that $\Delta I_{LS}$ is negative since the current falls during the LS cycle. This implies that the integrator output will fall, and to close the loop of the delta sigma converter we need feedback that can causes a positive change in $\Delta V_{INTEG}$.

$V_{INTEG}$ may correspond to the integrated voltage signal 603 as described previously. $\Delta V_{LS}$ will be on the node SW. There will not be any voltage change ideally on Virtual CM. This change gets converted eventually to a charge on CINT and hence the output 603.

Note the direction of Its is the same as the inductor current (i.e. away from the ground through $M_{LS}$). During the LS phase, the inductor is connected to a positive voltage $V_{OUT}$. This causes a virtual rising current in the inductor to ground, but since we are specifying inductor current in the opposite direction, $I_{LS}$ then has the negative meaning (it is falling, and hence negative). It is the same for a boost converter (since we then have a positive VBAT), and the same for a buck in reverse-current mode as well as the LS switches of a buck boost. Hence this circuit is sufficient for all those cases. However, a variant will be shown to cover the opposite case where $\Delta V_{INTEG}$ rises during sampling. This can happen in further embodiments where the output is a negative voltage and is connected to the ground through an inductor and an LS switch as above. Such cases can also easily occur for the HS switch in buck-boost mode.

As the integrated voltage $V_{INTEG}$ goes negative, this causes the comparator 610 to go high (logic 1). In the general case for a multi-bit quantizer (as described in further detail below), this means that the quantizer has a negative sign in front for falling $I_{LS}$.

For the change in the integrated voltage $\Delta V_{INTEG}$ rises case above, the inputs to the comparator 610 will be reversed for the same reason.

This comparator 610 is clocked using the clock signal $DS_{CLK}$ which defines the delta sigma sample rate. The comparator output enables the current source 718 (after gating with $φ_4$). This will cause a voltage $V_{FB}$ to develop across the switch 512 (also labelled) $M_{LSS}$ which is then sampled across the capacitor $C_{REF}$ through switches 702, 708. When this is then sampled on to the capacitor $C_{INT}$ using the switches 704, 706, the change in the output per output pulse is:

$$\Delta V_{INTEG} = \left(\frac{C_{REF}}{C_{INT}}\right)K_N I_{DAC} R_{DS(ON),MLS} \quad (4)$$

Note the use of the non-inverting integrator configuration here to get the positive change. This will be a positive change that will cancel the negative change due to the measured low side switch current $I_{LS}$.

Note that if the comparator 610 output is low, the current source 718 will not be turned on, and hence the related phases φ4, φ5, and φ6, need not be turned on.

In a delta sigma converter, the long-term average of both the forward and feedback expressions are equal in magnitude since the $V_{INTEG}$ will try to converge to zero. So, by equating and cancelling common terms, and taking averages of the variable terms, we get:

$$\overline{\Delta I_{LS}} = K_N I_{DAC}\overline{DS_L}\frac{C_{REF}}{C_S} \quad (5)$$

We assume the $M_{LS}$ to $M_{LSS}$ matching holds (as proven in US2023155472A1). $DS_L$ is the output of the delta-sigma modulator 204 (previously referred to as "D1").

Since all variables on the right hand side of equation (5) are constants, except $D_{SL}$, we can get the average slope by taking the average of the delta sigma output $DS_L$.

Note that the phases $\varphi_{5a,5b}$ and $\varphi_{6a,6b}$ are provided separately for possible mitigation of charge injection issues. In many cases $\varphi_{5a}=\varphi_{5b}$ and/or $\varphi_{6a}=\varphi_{6b}$ for simplicity.

The delta-sigma data stream $DS_L$ will reflect the average of the difference in $I_{LS}$ passing through $M_{LS}$ at 2 points in time: in the present example, the time defined by the fall of $\varphi 2$ (Tstart) and the time defined by the fall of $\varphi 1$ (Tend). The average of the $DS_L$ output will increase in proportion to the slope of $IL_S$, and with the knowledge of the time of Tstart and Tend and various gain terms in the channel, the actual $IL_S$ slope can be calculated.

Since we are only sampling during the time LS is ON, and since during this time, the current in $ML_S$ and the inductor L is the same, this measurement gives use the inductor slope current.

Note that the time between Tstart and Tstop need not span the entire slope (the time when LS is on). The average of the slope within Tstart and Tstop is often sufficient for many purposes, knowing Tstart and Tstop.

Depending on the actual slope of the inductor current, the output $DS_L$ will go to either high or low resulting in a pulse density proportional to the current slope. As discussed previously, for steeper slopes, there will be a larger number of high pulses compared to flatter current slopes.

Figure 9:
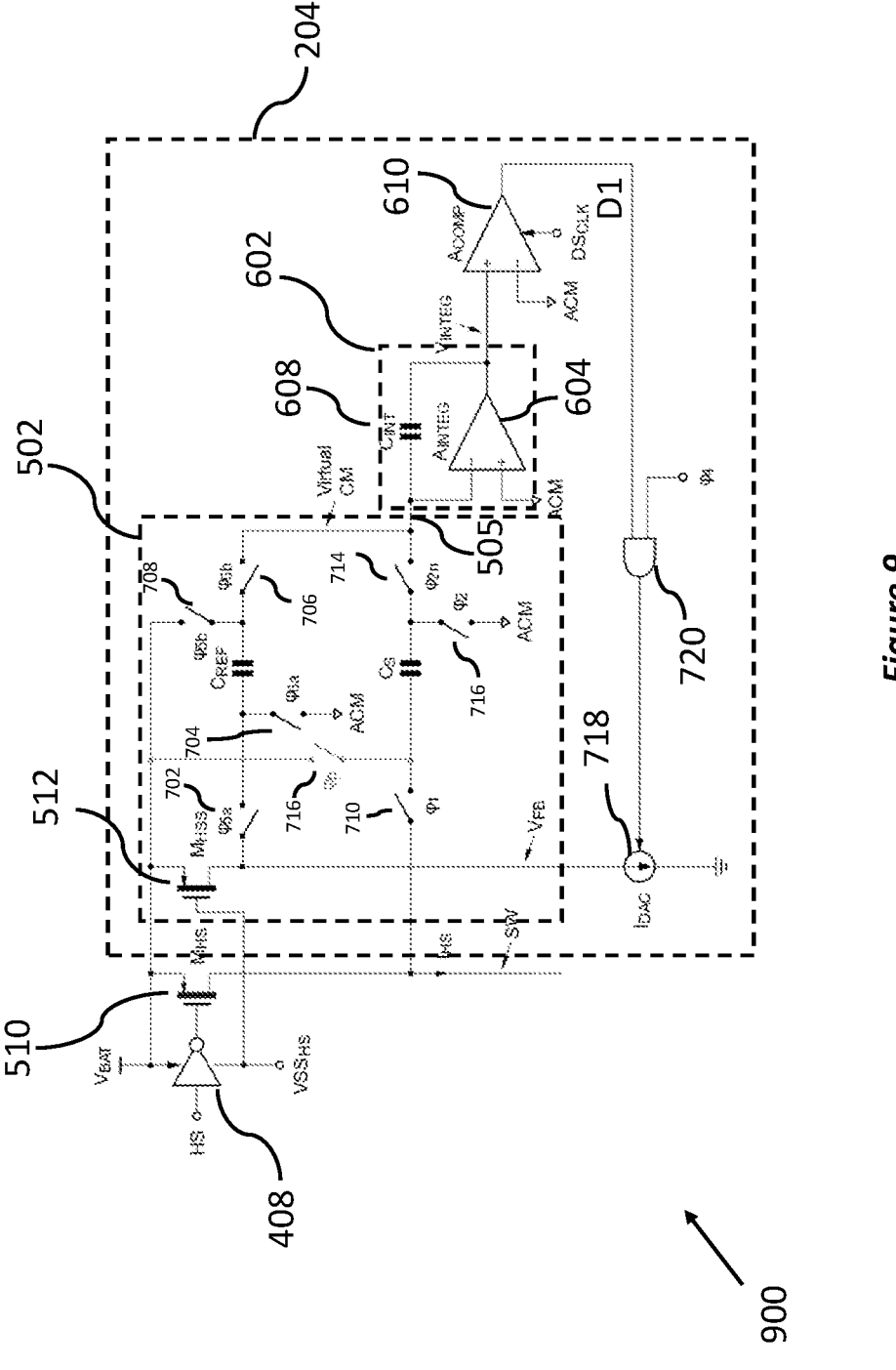
FIG. 9 is a schematic of an apparatus in accordance with an eleventh embodiment of the present disclosure.

FIG. 9 is a schematic of an apparatus 900 in accordance with an eleventh embodiment of the present disclosure. In the present example, there is shown a specific embodiment of the delta-sigma modulator 204 used with the buck converter 402 of FIG. 4(a). It will be appreciated that only the high side switch Mus and driver 408 of the buck converter 402 are shown to aid in the clarity of the drawing and description.

When compared with the apparatus 700 of FIG. 7, the present example relates to sensing using the high side switch $M_{HS}$ rather than the low side switch $M_{LS}$ and the behaviour of the present embodiment largely mirrors the behaviour as described for FIG. 7, as will be clear to the skilled person.

It will be appreciated that FIG. 9 illustrates the PMOS HS case, and in further embodiments, there may be provided an NMOS HS switch as in FIG. 4(b) and in accordance with the understanding of the skilled person. Due to the use of NMOS on the HS, the mirror transistor shall be a scaled down version of the $M_{HS}$ with similar connections as the PMOS $M_{HS}$ ($M_{HSS}$ gate to VBOOT, drain to VOUT and source to the delta sigma/reference as in the earlier circuits).

In the present example as shown in FIG. 9, preferably, the analog common mode (ACM) should be referenced to the VBAT to minimize power supply rejection ratio (PSRR) issues.

Note that for the present embodiment, the SW node voltage slope is inverted compared to the embodiment presented in FIG. 7 (i.e. current rising and SW voltage is falling). This is because in the HS phase, assuming a positive voltage at the VBAT, the current in the inductor rises when VOUT is less than VBAT, and this causes a dropping SW voltage due to the voltage drop across $M_{HS}$ with increasing current.

Figure 10B:
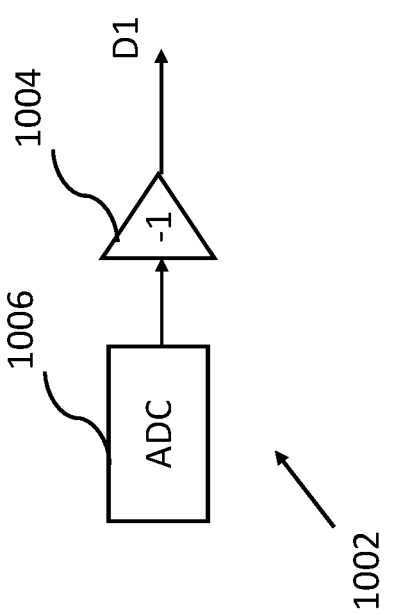
FIG. 10(b) is a schematic of a specific embodiment of the multi-bit quantizer.
Figure 10A:
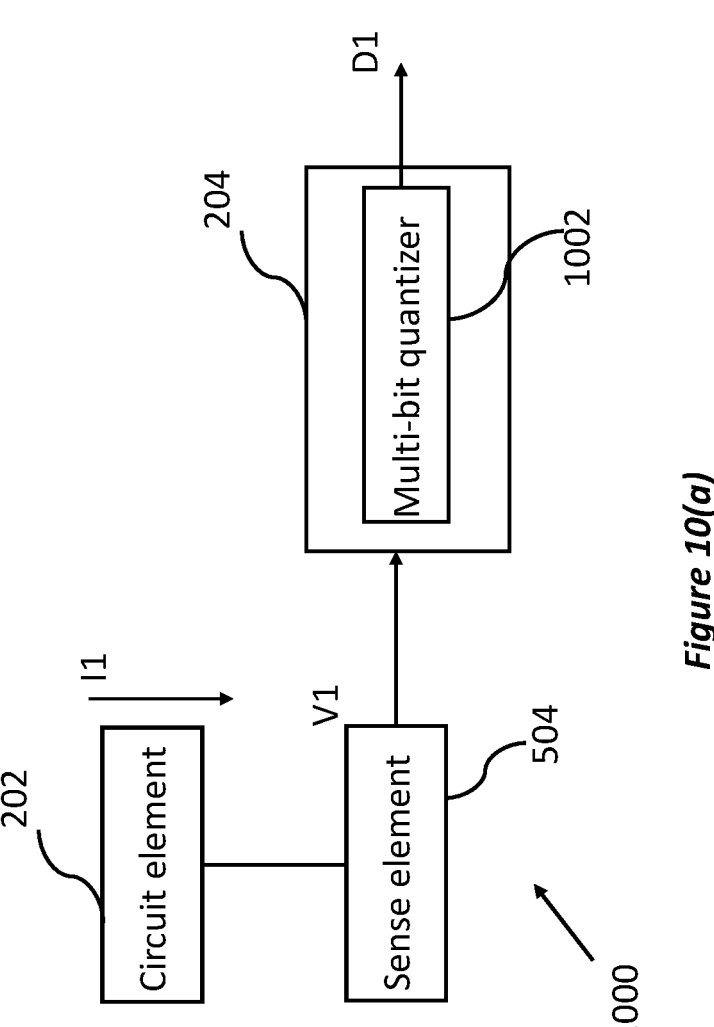
FIG. 10(a) is a schematic of an apparatus in accordance with a twelfth embodiment of the present disclosure.

FIG. 10(a) is a schematic of an apparatus 1000 in accordance with a twelfth embodiment of the present disclosure. In the present example, the digital signal D1 comprises a plurality of bits. The delta-sigma modulator 204 comprises a multi-bit quantizer 1002 that is configured to generate the digital signal D1.

FIG. 10(b) is a schematic of a specific embodiment of the multi-bit quantizer 1002. In the present embodiment the multi-bit quantizer 1002 comprises an inverter 1004 configured to invert the digital signal D1 prior to it being provided at an output. The multi-bit quantizer 1002 may further comprise an analog to digital converter 1006.

In a further embodiment, the inverter 1004 could be positioned before the ADC 1006. It will be appreciated that there is little practical difference in both cases because it is largely symbolic; in practice, the "−1" is simply part of the overall ADC implementation.

Figures 11A, 11B, 11C:
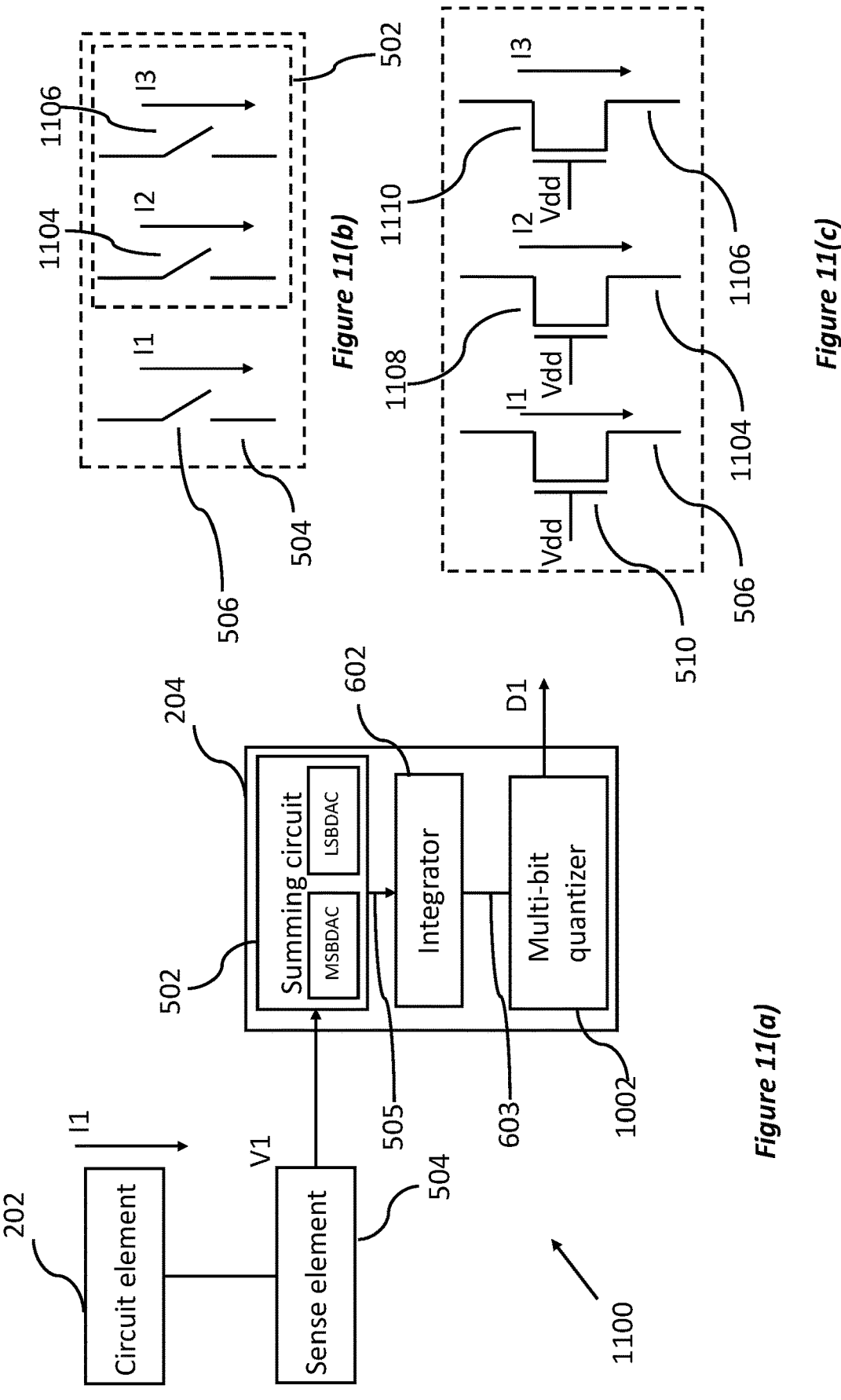
FIG. 11(a) is a schematic of an apparatus in accordance with a thirteenth embodiment of the present disclosure.
FIG. 11(b) is a schematic of an example embodiment of the sense element and the summing circuit.
FIG. 11(c) is a schematic of an example embodiment of the switches.

FIG. 11(a) is a schematic of an apparatus 1100 in accordance with a thirteenth embodiment of the present disclosure. The delta-sigma modulator 204 may comprise a most significant bit digital to analog converter (MSBDAC) for generating a first analog output signal for use in the generation of the most significant bits of the digital signal D1; and a least significant bit digital to analog converter (LSBDAC) for generating a second analog output signal relating to the least significant bits of the digital signal D1.

FIG. 11(b) is a schematic of an example embodiment of the sense element 504 and the summing circuit 502. In the present embodiment, the sense element 504 comprises the switch 506 having a resistance; and the summing circuit 502 comprises a mirror switches 1104, 1106 each having a resistance. A switch trio is formed by the switches 506, 1104, 1106 with the current I1 being flowing through the switch 506; the current I2 flowing through the switch 1104; and the current I3 flowing through the switch 1106 the switch 1104 relates to the most significant bit, the switch 1106 relates to the least significant bit.

FIG. 11(c) is a schematic of an example embodiment of the switches 506, 1104, 1106 being implemented using transistors 510, 1108, 1110, each having their gates coupled to a supply voltage Vdd.

Figure 12B:
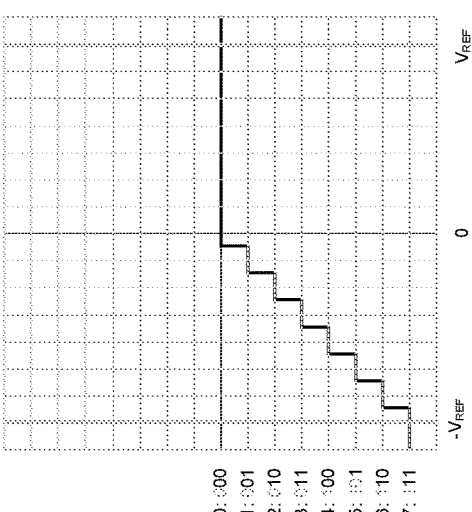
FIG. 12(b) is a graph showing the multi-bit quantizer transfer characteristics.
Figure 12A:
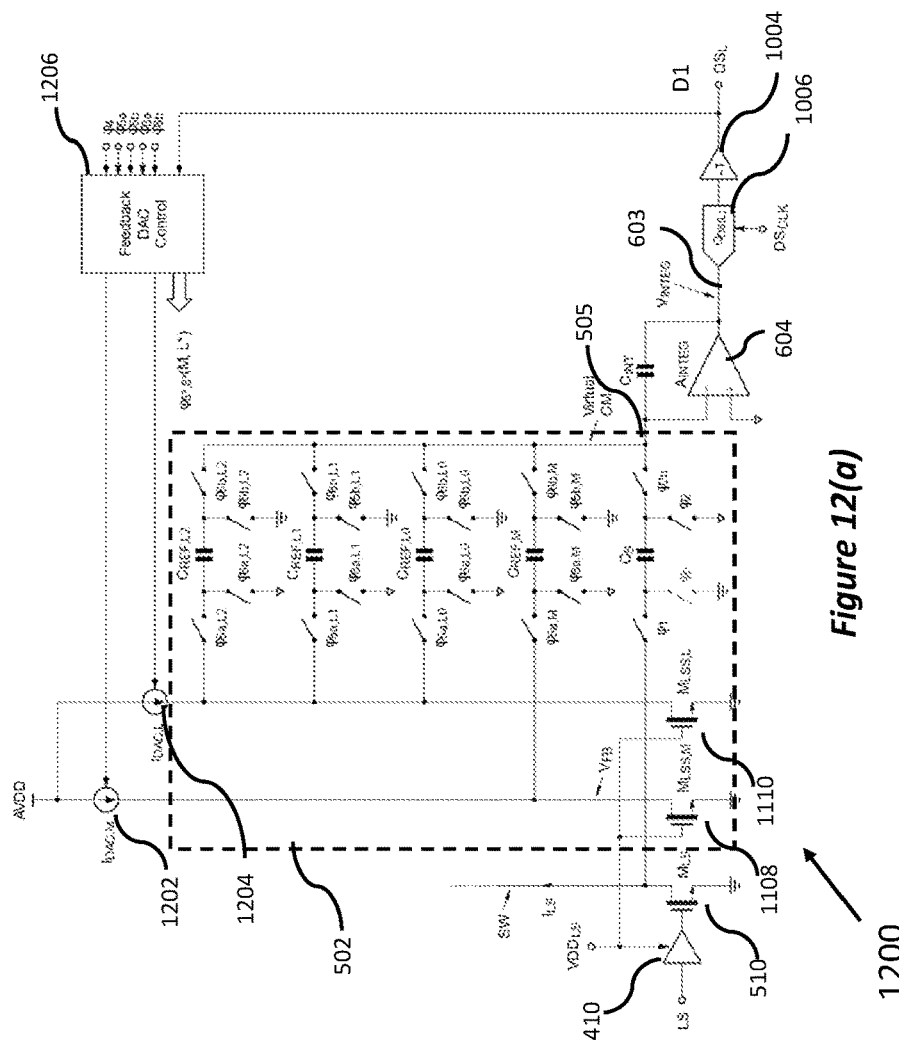
FIG. 12(a) is a schematic of an apparatus in accordance with a fourteenth embodiment of the present disclosure.

FIG. 12(a) is a schematic of an apparatus 1200 in accordance with a fourteenth embodiment of the present disclosure. In the present embodiment there is a current source 1202 coupled to the mirror transistor 1108, and a current sources 1204 coupled to the mirror transistor 1110. The delta-sigma modulator 204 further comprises a feedback circuit 1206 configured to receive the digital signal D1 and to control the current sources 1202, 1204 based on the received digital signal D1. The feedback circuit 1206 may comprise a feedback digital to analog converter control circuit.

In the present example the most significant bit DAC (MSBDAC) receives an input from the quantizer 1002, and comprises the current source 1202, the mirror device $M_{LSS,M}$ and the capacitor $C_{REF,M}$ and the switches associated with the capacitor $C_{REF,M}$. In the present example the least significant bit DAC (LSBDAC) receives an input from the quantizer 1002, and comprises the current source 1204, the mirror device $M_{LSS,L}$ and the capacitors $C_{REF,L0}$, $C_{REF,L1}$, $C_{REF,L2}$ and the switches associated with the capacitors $C_{REF,L0}$, $C_{REF,L1}$, $C_{REF,L2}$.

In the present example, we have 2 sub-DACs
1. A 2-bit LSB-DAC comprising the current source 1204 $I_{DAC,L}$, the capacitors $C_{REF,L0,1,2}$ (with corresponding switches), and the switch $M_{LSS,L}$
2. A 1-bit MSB-DAC comprising the current source 1206 $I_{DAC,H}$, the capacitor $C_{REF,M}$ (with corresponding switches), and the switch $M_{LSS,M}$ The bitstream output of a delta sigma converter will have noise shaping, meaning the quantization noise contribution will be low at low frequencies and will increase towards high frequencies. As with most delta-sigma converters, a decimation and filtering process needs to be done to extract a more high-resolution version of the current slope and this will necessarily result in a smaller output data rate with a smaller bandwidth. One potential way to increase the bandwidth is to reduce the OSR (oversampling rate), but this will increase the noise and hence the resolution of the output if no other changes are done. One common approach to improve the effective resolution is to use a multi-bit quantizer, for example, as provided by the present embodiment.

In the present embodiment, the single bit data stream $DS_L$ is replaced with a multi-bit stream. The comparator 610 has been replaced by the multi-bit quantizer 1002 (typically a flash ADC or similar). This will then imply that the feedback to the circuit is also multibit, and there are 3 ways to apply that feedback:

1) Multiple $I_{DAC}$ elements
2) Multiple $C_{REF}$ elements, with their switches possible shared depending on charge injection and parasitic capacitance concerns
3) Multiple $M_{LSS}$ elements These elements will be switched in and out depending on the DAC code. The elements in any of the above can be weighted. Any combination of the above can also be used and with different weightings, so that the DAC resolution is split into several sub-fields that are applied to the different element arrays above.

The frequency of the clock $DS_{CLK}$ fed to the quantizer 1006 is typically the same frequency as the switching converter or a sub-multiple.

FIG. 12(b) is a graph showing the multi-bit quantizer 1002 transfer characteristics. The inversion before the multi-bit quantizer 1002 is to show that the feedback needs to be in the opposite direction. In practice it means that the transfer characteristic of the quantizer is as shown in FIG. 12(b) (for a 3-bit negative-only quantizer with inversion).

As the voltage decreases in value the output of the quantizer changes monotonically as shown. For example, when the voltage cross $-V_{REF}/14$, the output goes from 000 to 001. The lower 2 bits in this case will be fed back through the first (LSB) branch and the upper 1 bit is fed back through the second (MSB) branch. The 2 LSB bits will decide how many of the CREF and switches corresponding to the LSB branch are turned on the corresponding MSB bit will decide if the MSB branch is turned on. The second branch will be weighted appropriately (4×), by changing its $C_{REF,M}$, $M_{LSS,M}$, or $I_{DAC,M}$ as noted above.

Since the output of the integrator 602 will not rise positively (assuming positive slope at SW), there is no need to quantize the positive half for this example. It should be noted that in a further embodiment having a negative slope (for example buck-boost), this will be flipped (positive side rising, negative side flat 0).

The present example measure the voltage across $M_{LS}$ during the LS phase. This works best when the width of the LS phase exceeds the HS phase. For a case where the HS phase is significantly larger than the LS phase (e.g. a Buck converter operating near full duty cycle because $V_{out}$ is only slightly lower that $V_{BAT}$), it is often more effective to measure the same signal across the HS pass device $M_{HS}$.

We can have inverted voltage slopes compared to each of the above configurations for the switches in the following case:

1) LS side operation with negative terminal voltages
2) HS side operation with negative terminal voltages
3) Buck-boost where both HS sides are active. Depending on the relative difference between $V_{BAT}$ and $V_{OUT}$, the current slope can be in either direction.

This can be accommodated by a small change in the switch connection for the $C_{REF}$.

FIG. 13(a) is a schematic of the reference capacitor section for low side switch sensing, as shown in the apparatus 700 of FIG. 7.

FIG. 13(b) is a schematic of the reference capacitor section for high side switch sensing, as shown in the apparatus 900 of FIG. 9.

In both cases illustrated in FIGS. 13(a) and 13(b), the input switches can be swapped, and the phases can be changed to the below timings. This will result in the removal of $\varphi_{5a}$ and $\varphi_{6a}$, since the same purpose is now served by $M_{LSS}/M_{HSS}$ and $I_{DAC}$.

FIG. 13(c) is a schematic of an alternative embodiment of the reference capacitor section as may replace the reference capacitor sections of FIGS. 7 and FIG. 9.

FIG. 13(d) is a schematic of an embodiment of the reference capacitor section as may be applied for use with a buck-boost converter.

Switches marked ":n" are for the normal case, and ":i" are for the inverted case. $\varphi_{6b}$ is common. Note that the timings should be reconfigured depending on the case and will be generated appropriated using the timing generator.

It will be appreciated that there may be multiple switches for typical switching converter. For example, in a buck converter there may be both a LS sense as well as a HS sense. In some cases, one or more of these can be omitted if there is a redundancy in information. For example, in a buck converter, both switches convey the same information. If the input $V_{IN}$ has a significantly higher voltage than $V_{OUT}$, the typical duty cycle will be low ($M_{LS}$ will be on for significantly longer than $M_{HS}$), and the circuit for measuring $M_{HS}$ current can be omitted since the $M_{HS}$ phase is much shorter compared to the $M_{LS}$ phase and does not offer any value.

Embodiments of the present disclosure may also be used to estimate equivalent inductance under the prevailing operating conditions. This information can be used for:

1. Monitoring of properties of the circuit including ageing of components.
   a. Inductance of the inductor
2. Possible estimation of real inductance curve as current varies, allowing for adaptive tuning.

Figure 14:
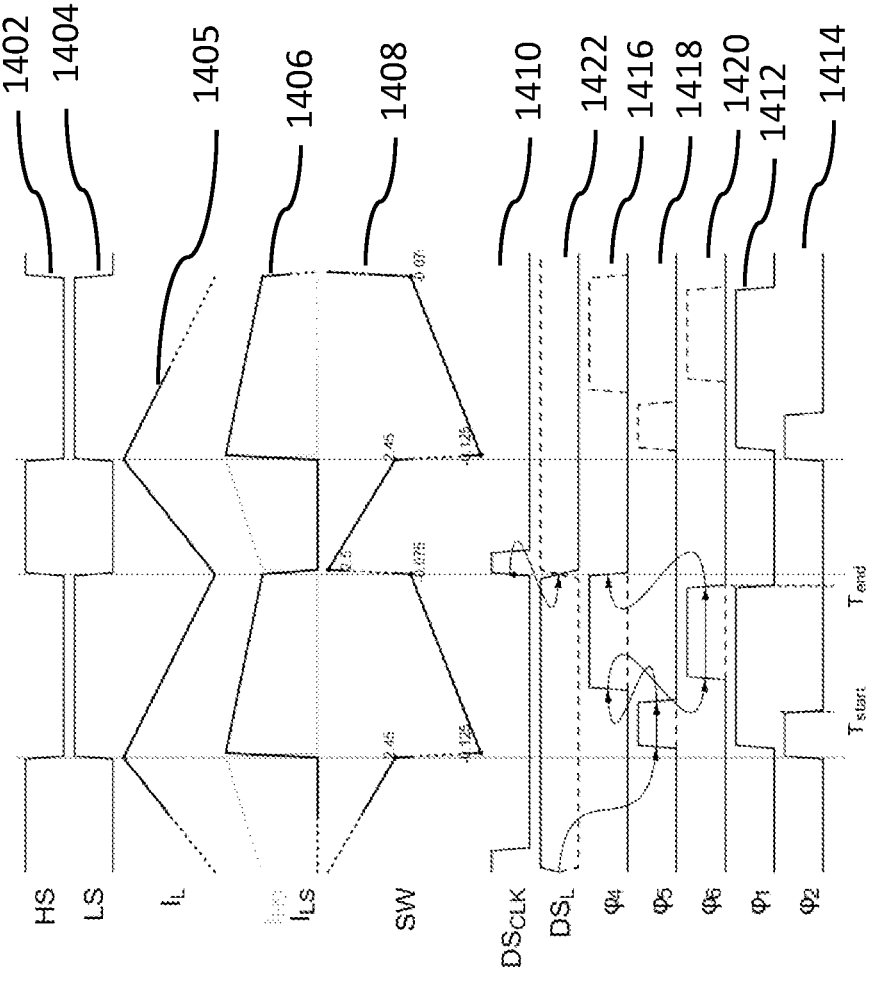
FIG. 14 is a timing graph showing an example operation of the delta-sigma modulator of FIG. 9 used with the buck converter of FIG. 4(a) and using the reference capacitor section of FIG. 13(c)
Figure 15:
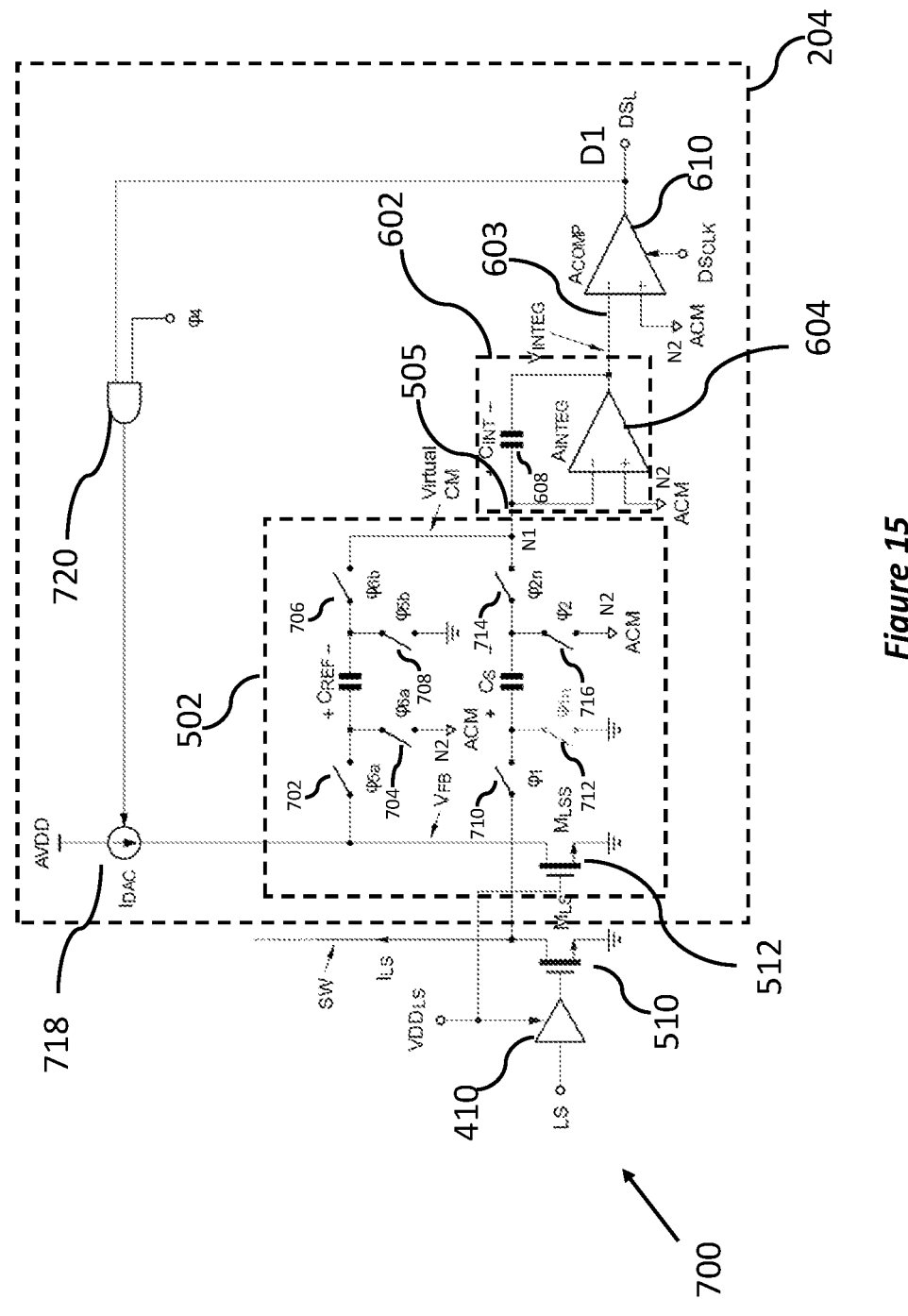
FIG. 15 is an alternative schematic of the apparatus of FIG. 7.
Figure 16:
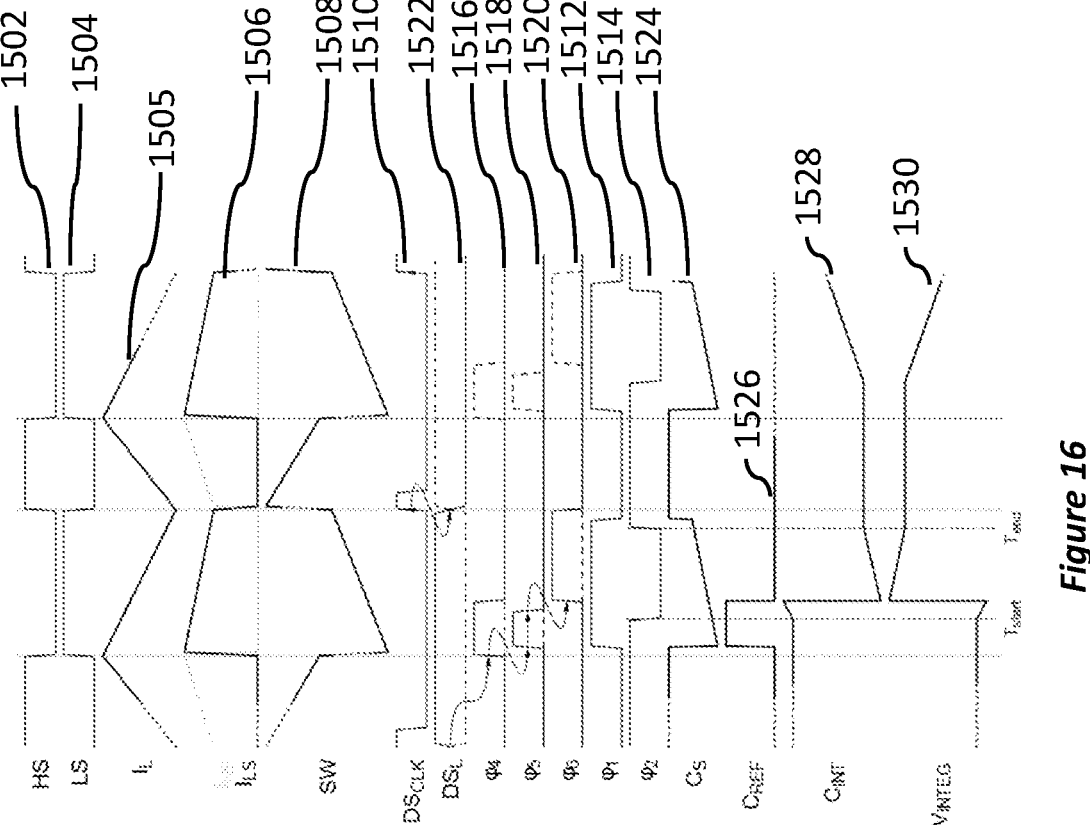
FIG. 16 is a timing graph showing an example operation of the delta-sigma modulator of FIG. 15 used with the buck converter of FIG. 4(a)

FIG. 14 is a timing graph 1400 showing an example operation of the delta-sigma modulator 204 of FIG. 9 used with the buck converter 402 of FIG. 4(a) and using the reference capacitor section of FIG. 13(c). There is shown a high side switch control signal (a trace 1402); a low side switch control signal (a trace 1404); a current flow through the inductor (a trace 1405); a current flow through the low side switch $M_{LS}$ (a trace 1406); a voltage at a switch node SW (a trace 1408); a clock signal $DS_{CLK}$ (also labelled as CLK in other embodiments, and shown by a trace 1410); and control signals as provided to the switches shown in FIG. 9 and labelled as follows $\varphi 1$ (a trace 1412), $\varphi 2$ (a trace 1414), $\varphi 4$ (a trace 1416), $\varphi 5$ (a trace 1418), $\varphi 6$ (a trace 1420); and the digital signal D1 (also labelled as $DS_L$, and shown by a trace 1422). FIG. 15 is an alternative schematic of the apparatus 700 of FIG. 7. FIG. 16 is a timing graph 1600 showing an example operation of the delta-sigma modulator 204 of FIG. 15 used with the buck converter 402 of FIG. 4(a). There is shown a high side switch control signal (a trace 1502); a low side switch control signal (a trace 1504); a current flow through the inductor (a trace 1505); a current flow through the low side switch $M_{LS}$ (a trace 1506); a voltage at a switch node SW (a trace 1508); a clock signal $DS_{CLK}$ (also labelled as CLK in other embodiments, and shown by a trace 1510); and control signals as provided to the switches shown in FIG. 15 and labelled as follows $\varphi 1$ (a trace 1512), $\varphi 2$ (a trace 1514), $\varphi 4$ (a trace 1516), $\varphi 5$ (a trace

US 12,700,789 B2

17

1518), φ6 (a trace 1520); the digital signal D1 (also labelled as DS$_L$, and shown by a trace 1522); a voltage across the capacitor C$_S$ (shown by a trace 1524); a voltage across the capacitor C$_{REF}$ (shown by a trace 1526) a voltage across the capacitor C$_{INT}$ (also labelled by numeral 608, and shown by a trace 1528); an integrated voltage signal V$_{INTEG}$ (also labelled by reference numeral 603, and shown by a trace 1530).

When the low side switch control signal LS is low, the circuit is not operational, and the voltages across the capacitors are kept at the same level, and as a result everything remains "frozen".

When the low side switch control signal LS goes high, M$_{LS}$ is driven on (M$_{LSS}$ is always on). Since I$_{LS}$ is flowing through M$_{LS}$, a voltage develops across M$_{LS}$ and this is seen on the node SW relative to ground.

We initially assume φ1 is low and φ2 is high. In this case the capacitor C$_S$ is tied to ground and analog common mode (ACM).

Once φ1 goes high, the capacitor C$_S$ starts charging and will track the voltage at the node SW. In normal closed loop operation, the voltage at the virtual CM remains at ACM (assuming an ideal A$_{INTEG}$). So φ2 does not affect the voltage at the negative terminal of the capacitor C$_S$. So, we can assume that the charging/tracking operation of the capacitor C$_S$ depends only on φ1. We keep φ1 active only during the LS period, and this helps isolate the delta sigma converter 204 from the switching noise on the node SW during the HS phase.

φ2 is only active for a subset of φ1. During this phase, the current that flows through the capacitor C$_S$ will flow through the capacitor C$_{INT}$ through the corresponding switches instead of to ACM. This means the actual signal on the node SW is only sampled onto the integrating capacitor C$_{INT}$ during this φ2.

Noting that the capacitors C$_S$, C$_{INT}$ are in series and the polarities are identical, so we see that during the low phase φ2, the change of voltage across C$_{INT}$ will be, $$\Delta V_{C_{INT}} = \frac{C_S}{C_{INT}} \Delta V_{SW} \qquad (6)$$

This follows from the fact that charge in a capacitor Q=CV and the charge that moves into the capacitor C$_S$ is the same as that which moves into the capacitor C$_{INT}$.

This accumulates over cycles (integration). The output V$_{INTEG}$ will be (ACM−V$_{CINT}$). This φ2 sampling operation is referred to as a correlated double sampling operation here, since 2 samples are taken (when φ2 falls and then when φ2 rises). The difference between these 2 points is the only portion that is sampled into the integration capacitor, as described above.

Now, we follow the reference path. We assume the output of the integrator (V$_{INTEG}$) is initially slightly negative. This causes A$_{COMP}$ output to be asserted high on DS$_{CLK}$ as noted in the diagram, and thus causes φ4,5,6 to toggle as indicated. φ4 drives a current through M$_{LSS}$, which causes a voltage V$_{FB}$ to develop across on the feedback node indicated.

When φ5 goes high, it causes the voltage V$_{FB}$ to be sampled into the capacitor C$_{REF}$. The polarity is noted in the timing diagram. This voltage is retained as the charge has nowhere to go even as φ5 is turned off, until goes φ6 high. At this point, it discharges into the capacitor C$_{INT}$, through the normal operation of the A$_{INTEG}$ closed loop operation. Like the above change, we get a change in the capacitor C$_{INT}$, but in the opposite direction, since φ6 causes the capacitor C$_{INT}$ to discharge in the opposite direction. Hence, the sudden drop in the capacitor C$_{INT}$ (and corresponding rise in V$_{INTEG}$), when φ6 goes high.

Due to this change in V$_{INTEG}$, the absolute voltage of V$_{INTEG}$ now goes positive and the comparator 610 will not go high on the next DS$_{CLK}$ edge, and hence φ4,5,6 will not go high, so there are no negative jumps on V$_{INTEG}$.

Over an extended period, the accumulated magnitude of negative jumps should match the amount of positive change, and thus by accumulating the pulses from the comparator 610, we are able to estimate the change in the node SW and hence the current slope.

Note that we have assumed infinite gain and bandwidth for the differential amplifier 604, hence the ideal graphs.

Figure 17:
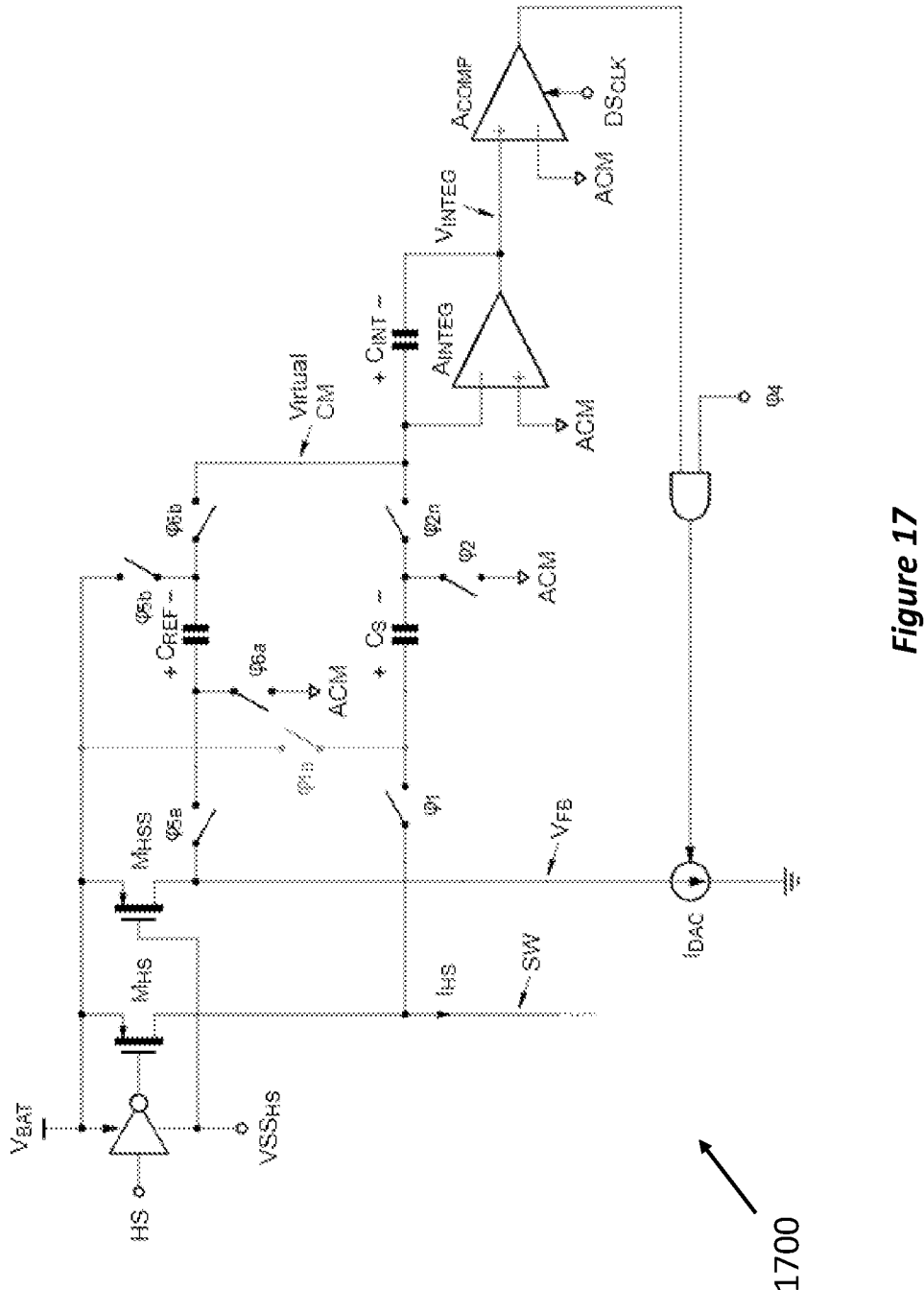
FIG. 17 is a schematic of an apparatus in accordance with a fifteenth embodiment of the present disclosure.
Figure 18:
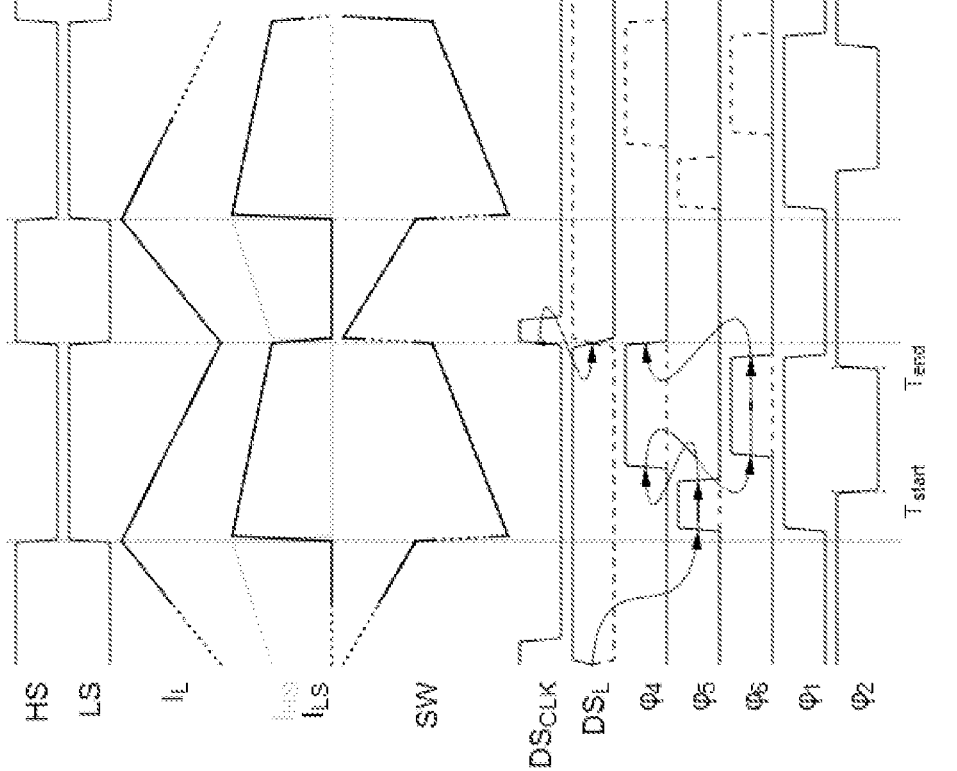
FIG. 18 is a timing graph showing an example operation of the delta-sigma modulator of FIG. 17 used with the buck converter of FIG. 4(a).
Figure 18:
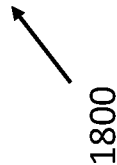

FIG. 17 is a schematic of an apparatus 1700 in accordance with a fifteenth embodiment of the present disclosure. In the present example, there is shown a specific embodiment of the delta-sigma modulator 204 used with the buck converter 402 of FIG. 4(a). It will be appreciated that only the high side switch M$_{HS}$ and driver 408 of the buck converter 402 are shown to aid in the clarity of the drawing and description. FIG. 18 is a timing graph 1800 showing an example operation of the delta-sigma modulator 204 of FIG. 17 used with the buck converter 402 of FIG. 4(a).

Various improvements and modifications can be made to the above without departing from the scope of the disclosure.

The invention claimed is:

1. An apparatus for generating a digital signal that is dependent on an average slope of a first current flowing through a circuit element during a sample period, the apparatus comprising:
a delta-sigma modulator configured to:
sense the first current during the sample period; and
generate the digital signal using the sensed first current by converting the average slope of the first current into the digital signal,
wherein the average slope of the sensed first current is an average rate of change of the sensed first current with time.

2. The apparatus of claim 1, comprising a slope calculation unit configured to:
receive the digital signal; and
determine the average slope of the first current during the sample period using the digital signal.

3. The apparatus of claim 1, wherein the delta-sigma modulator is configured to sense the first current flowing through the circuit element of a switching converter.

4. The apparatus of claim 3, wherein the delta-sigma modulator is configured to sense the first current flowing through the circuit element by sensing a current flow through a first power switch of the switching converter.

5. The apparatus of claim 1, wherein the delta-sigma modulator is configured to:
sense the first current at a first time step and at a second time step within the sample period; and
generate the digital signal using the first current as sensed at the first time step and at the second time step.

6. The apparatus of claim 5, wherein the delta-sigma modulator comprises:
a summing circuit configured to:
sense the first current at the first time step by measuring a first voltage across a sense element at the first time step;

sense the first current at the second time step by measuring the first voltage across the sense element at the second time step; and generate a difference signal that is dependent on the first voltage at the second time step subtracted from the first voltage at the first time step, wherein the first voltage is dependent on the first current.

7. The apparatus of claim 6, wherein:

the sense element comprises a first switch having a first resistance; and the summing circuit comprises a mirror switch having a second resistance, and forming a switch pair comprising the first switch and the mirror switch.

8. The apparatus of claim 7, wherein:

the first switch comprises a first transistor; and the mirror switch comprises a second transistor, wherein gates of each of the first and second transistors are configured to receive a supply voltage.

9. The apparatus of claim 8, wherein the summing circuit comprises:

a first capacitor having:

a first terminal coupled to:

a first terminal of the first transistor via a first switch; and a ground terminal via a second switch; and a second terminal coupled to:

a difference node via a third switch; and a common mode gain terminal via a fourth switch; and a second capacitor having:

a first terminal coupled to:

a first terminal of a mirror transistor via a fifth switch; and the common mode gain terminal via a sixth switch; and a second terminal coupled to:

the difference node via a seventh switch; and the ground terminal via an eighth switch.

10. The apparatus of claim 6, wherein the delta-sigma modulator comprises a first integration circuit configured to receive the difference signal and to generate an integrated voltage signal.

11. The apparatus of claim 10, wherein the first integration circuit comprises a first differential amplifier.

12. The apparatus of claim 11, wherein:

the first integration circuit comprises a first integration circuit capacitor; and a first input terminal of the first differential amplifier is coupled to an output terminal of the first differential amplifier via the first integration circuit capacitor.

13. The apparatus of claim 10, wherein the delta-sigma modulator comprises a first comparator configured to receive the integrated voltage signal and to output the digital signal.

14. The apparatus of claim 1, wherein the digital signal comprises a plurality of bits.

15. The apparatus of claim 14, wherein the delta-sigma modulator comprises a multi-bit quantizer configured to generate the digital signal.

16. The apparatus of claim 15, wherein the delta-sigma modulator is configured to:

sense the first current at a first time step and at a second time step within the sample period; and generate the digital signal using the first current as sensed at the first time step and at the second time step.

17. The apparatus of claim 16, wherein the delta-sigma modulator comprises:

a summing circuit configured to:

sense the first current at the first time step by measuring a first voltage across a sense element at the first time step;

sense the first current at the second time step by measuring the first voltage across the sense element at the second time step; and generate a difference signal that is dependent on an second voltage subtracted from the first voltage, wherein the first voltage is dependent on the first current.

18. The apparatus of claim 17, wherein the delta-sigma modulator comprises a first integration circuit configured to receive the difference signal and to generate an integrated voltage signal.

19. The apparatus of claim 18, wherein the first integration circuit comprises a first differential amplifier.

20. The apparatus of claim 19, wherein:

the first integration circuit comprises a first integration circuit capacitor; and a first input terminal of the first differential amplifier is coupled to an output terminal of the first differential amplifier via the first integration circuit capacitor.

21. The apparatus of claim 20, wherein the delta-sigma modulator comprises:

a most significant bit digital to analog converter for generating a first analog output signal for use in the generation of the most significant bits of the digital signal; and a least significant bit digital to analog converter for generating a second analog output signal for use in the generation of the least significant bits of the digital signal.

22. A method of generating a digital signal that is dependent on an average slope of a first current flowing through a circuit element during a sample period, the method comprising:

sensing, using a delta-sigma modulator, the first current during the sample period; and generating, using the delta-sigma modulator, the digital signal using the sensed first current by converting the average slope of the first current into the digital signal, wherein the average slope of the first current is an average rate of change of the first current with time.

* * * * *